(12) United States Patent
Cruson et al.

(10) Patent No.: US 8,298,312 B2
(45) Date of Patent: Oct. 30, 2012

(54) DEVICE AND METHOD FOR COMPOSTING

(76) Inventors: Brian A. Cruson, Abbotsford (CA);
Pieter J. Cruson, Pilot Butte (CA);
Izaak P. J. Cruson, Pilot Butte (CA);
Ken Peakman, Balgonie (CA); Trent Nichols, Indian Head (CA); Michael P. Booy, Emerald Park (CA)

( * ) Notice: Subject to any disclaimer, the term of this patent is extended or adjusted under 35 U.S.C. 154(b) by 0 days.

(21) Appl. No.: 13/363,952

(22) Filed: Feb. 1, 2012

(65) Prior Publication Data

US 2012/0125063 A1 May 24, 2012

Related U.S. Application Data

(63) Continuation of application No. 12/951,802, filed on Nov. 22, 2010, which is a continuation-in-part of application No. 10/944,276, filed on Sep. 20, 2004, now abandoned.

(30) Foreign Application Priority Data

Sep. 19, 2003 (CA) ...................................... 2441658

(51) Int. Cl.
*C12M 3/00* (2006.01)
(52) U.S. Cl. .................. 71/11; 71/14; 71/15; 435/290.1; 435/290.2
(58) Field of Classification Search .................. 71/11, 14, 71/15; 435/290.1, 290.2
See application file for complete search history.

(56) References Cited

U.S. PATENT DOCUMENTS

| | | | |
|---|---|---|---|
| 1,734,632 A * | 11/1929 | Merrill | ............................. 162/59 |
| 3,845,939 A | 11/1974 | Waldenville | |
| 3,850,364 A | 11/1974 | Robbins | |
| 5,382,092 A * | 1/1995 | Okamoto et al. | ............. 366/320 |
| 5,587,320 A | 12/1996 | Shindo et al. | |
| 5,634,600 A * | 6/1997 | Kubota et al. | ................... 241/36 |
| 5,687,918 A | 11/1997 | Kubota | |
| 5,744,351 A | 4/1998 | Bryan-Brown | |
| 5,753,498 A * | 5/1998 | Ueda et al. | ................. 435/290.2 |
| 5,843,769 A | 12/1998 | Jonninen | |
| 5,890,664 A | 4/1999 | Conant | |
| 5,948,674 A | 9/1999 | Mankiewicz | |
| 6,149,083 A * | 11/2000 | McFarland | ................... 241/82.5 |

\* cited by examiner

*Primary Examiner* — Jessica L Ward
*Assistant Examiner* — Erin Saad
(74) *Attorney, Agent, or Firm* — Ryan W. Dupuis; Kyle R. Sa Herthwaite; Ade & Company Inc.

(57) ABSTRACT

A composter device is provided including a mixer and a grinder commonly driven and commonly located in a composting chamber of the device. A large opening at the top of the composting chamber permits large objects to be inserted into the chamber to permit the object to be ground and left to decompose to produce compost material in the same chamber. The grinder includes grinding elements arranged to produce a shearing action while the mixer includes an auger to produce a churning action when the ground matter requires periodic mixing during the decomposition process to produce compost.

17 Claims, 21 Drawing Sheets

DEVICE AND METHOD FOR COMPOSTING

This application is a continuation of U.S. application Ser. No. 12/951,802, filed Nov. 22, 2010 which is a continuation-in-part of U.S. patent application Ser No. 10/944,276, filed Sep. 20, 2004 and which claims foreign priority benefits from Canadian Patent Application 2,441,658, filed Sep. 19, 2003.

FIELD OF THE INVENTION

The present invention relates to a composting device and method of use thereof for producing compost material.

BACKGROUND

The process of composting, in which various organic materials including vegetable matter and animal carcasses and the like are decomposed to produce compost material, is known for making use of the compost material as a soil fertilizer. In many instances the matter is simply left to decompose in a large pile exposed to the elements. Before collecting the matter to be decomposed in a pile it is desirable to break up the matter to expose a larger surface area so that micro organisms can more readily decompose the matter. U.S. Pat. No. 3,850,364 to Robbins provides an example of a portable compost grinding apparatus which is suitable for reducing matter to be decomposed into smaller particles to assist in the decomposition process. The actual decomposition of the matter is left to be accomplished by conventional means such as storing in a pile as noted above.

In order to provide improved conditions for composting, it is typical to provide a bin within which matter to be decomposed is placed to produce composted material. U.S. Pat. No. 5,890,664 to Conant, U.S. Pat. No. 5,843,769 to Jonninen, U.S. Pat. No. 5,687,918 to Kubota and U.S. Pat. No. 5,948,674 to Mankiewicz disclose examples of composting devices in which mixers are provided to improve efficiency of the composting process by providing fresh air for the micro organisms to consume when decomposing the matter to be composted. In each instance however the matter to be composted is required to be sufficiently prepared by a grinding apparatus as described above for proper operation thereof which is both time consuming and costly when separate components are required.

U.S. Pat. No. 3,845,939 to Waldenville describes a composting apparatus including mixing elements to periodically mix the matter to be composted as in some of the previous prior art. A shredder device is provided at the inlet of the compost device to break up matter to be composted into smaller pieces however the particular construction of the shredding elements located in a narrow inlet tube would not permit large items like animal carcasses to be prepared for composting. Accordingly none of the prior art permits a user to both prepare and efficiently decompose large organic matter to be composted in a single operation using a single piece of equipment.

SUMMARY

According to one aspect of the present invention there is provided a composter device for composting a whole object, the device comprising:

a housing having a composting chamber arranged to receive the whole object therein;

a grinder supported in the composting chamber at the bottom end of the composting chamber so as to be arranged for grinding the whole object into a ground material; and a mixing member supported in the composting chamber above the grinder for rotation about an upright axis relative to the housing so as to be arranged for mixing the ground material above the grinder;

the grinder including a first grinding element and a second grinding element rotatable relative to one another about the upright axis of the mixing member;

the first grinding element comprising a rigid member including a slot formed therein which extends fully through the rigid member from a first side to a second side of the rigid member and defining first edges at a periphery of the slot;

the second grinding element comprising a lug defining second edges which closely fits within the slot and which is arranged to pass fully through the slot from the first side to the second side of the rigid member as the grinding elements are rotated relative to one another;

the first edges of the first grinding element being rotatable in close proximity past the second edge of the second grinding element so as to be arranged to produce a shearing action between the first and second edges for grinding the object into the ground material.

The use of composter device including both a grinder and a mixer in a common compost chamber permits compost matter to be both prepared and decomposed within a single chamber which requires minimal handling or involvement on the part of a user of the composter device. The construction of the composter device readily permits a common drive to be provided on both the grinder and the mixer.

The rigid member forming the first grinding element preferably extends radially out from the upright axis of the mixer. The lug in this instance is preferably arranged to pass fully through the slot in the rigid member from the first side to the second side of the rigid member in a circumferential direction in relation to the upright axis.

The slot in the rigid member may be open to a bottom side of the rigid member such that the lug is supported on a bottom wall of the composting chamber.

When there is provided a horizontal base plate at the bottom of the composting chamber which supports the lug thereon, the rigid member is preferably located directly adjacent the base plate such that the rigid member and the base plate are rotatable relative to one another.

Preferably there is provided a plurality of lugs supported on the base plate so as to be arranged to be received in the slot as the first and second grinding elements are rotated relative to one another.

Preferably the first grinding element is rotatable relative to the housing and the second grinding element is fixed and stationary relative to the housing.

The lug may include a leading edge which extends upwardly at an inclination in a direction of rotation of the grinding element towards the slot of the other grinding element to confront the other grinding element as the grinding elements are rotated relative to one another.

The rigid member preferably comprises at least one guide tooth above the slot which projects into a direction of relative rotation of the rigid member in which the guide tooth comprises a leading edge extending downwardly and inwardly towards the slot.

The sweep arm is preferably in proximity to a wall of the composting chamber throughout a length of the sweep arm between a bottom end and a top end of the sweep arm such that the housing is substantially unobstructed along the upright axis of the mixer so as to be arranged to allow access of a substantially whole livestock carcass to the grinder at the bottom end of the composting chamber.

There may be provided a gearbox having a gearbox housing and a gearbox output shaft supported for rotation relative to the gearbox housing by respective gearbox bearings and a motor coupled to the gearbox so as to drive rotation of the gearbox output shaft. In this instance, the mixer may include a drive shaft extending through the bottom end of the composting chamber for rotation relative to the housing of the composing chamber with the mixer about the upright axis.

In one embodiment, the gearbox housing is supported in an axial direction of the drive shaft primarily by connection of the gearbox output shaft to the drive shaft of the mixer. In this instance, the gearbox housing is preferably coupled to the housing of the composting chamber by a torque member acting primarily to resist rotation of the gearbox housing relative to the housing of the composting chamber about the upright axis of the mixer.

According to a second aspect of the present invention there is provided a composter device for composting a substantially whole livestock carcass, the device comprising:

a housing having a composting chamber arranged to receive the livestock carcass therein;

a grinder supported in the composting chamber at the bottom end of the composting chamber so as to be arranged for grinding the carcass into a ground material;

the grinder including a first grinding element having first edges and a second grinding element having second edges in which the first and second edges are rotatable relative to one another in close proximity past one another so as to be arranged to produce a shearing action between the first and second edges for grinding the livestock carcass into the ground material; and a mixing member supported in the composting chamber above the grinder for rotation about an upright axis relative to the housing so as to be arranged for mixing the ground material;

the mixer comprising a sweep arm which spirals upwardly in a direction sloping away from a direction of rotation of the sweep arm from a bottom end of the sweep arm adjacent the grinder at the bottom end of the chamber to a top end of the sweep arm spaced above the bottom end of the chamber;

the sweep arm being in proximity to a wall of the composting chamber throughout a full length of the sweep arm between the bottom end and the top end of the sweep arm such that the sweep arm is movable about the composting chamber in a sweeping motion adjacent the wall of the composting chamber and such that the housing is substantially unobstructed along the upright axis of the mixer so as to be arranged to allow access of the substantially whole livestock carcass to grinder at the bottom end of the composting chamber.

Preferably the sweep arm is fully supported relative to the housing at the bottom end by axially spaced apart bearings below the bottom end of the composting chamber such that the top end of the sweep arm comprises a free unsupported end.

The composting chamber preferably includes a conical wall tapering downwardly and inwardly towards the grinder at the bottom end of the chamber. In this instance, the sweep arm preferably has an increasing diameter with increasing distance from the bottom end to the top end such that the sweep arm is in proximity to the conical wall throughout the full length of the sweep arm.

There may be provided a fixed member supported on a wall of the composting chamber at an intermediate location along the length of the sweep arm in alignment with a slot on the sweep arm such that the fixed member passes through the slot as the mixer is rotated.

There may be provided a plurality of fixed members supported on the wall of the composting chamber in alignment with said slot on the sweep arm.

Alternatively there may be provided a fixed member supported on a wall of the composting chamber at an intermediate location along the length of the sweep arm in which the fixed member has a thickness which is arranged to substantially fully span a gap between the sweep arm and the peripheral wall as the sweep arm is rotated past the fixed member.

The sweep arm of the mixer preferably includes an upper ramped surface extending along a length of the sweep arm and spanning horizontally in a radial direction across a width of the sweep arm so as to be arranged to urge material in the composting chamber upwardly at a periphery of the chamber along the ramp surface of the mixer as the mixer is rotated.

According to a further aspect of the present invention there is provided a composter device for composting a whole object, the device comprising:

a housing having a composting chamber arranged to receive the whole object therein;

a grinder supported in the composting chamber at the bottom end of the composting chamber so as to be arranged for grinding the whole object into a ground material;

the grinder including a first grinding element having first edges and a second grinding element having second edges in which the first and second edges are rotatable relative to one another in close proximity past one another so as to be arranged to produce a shearing action between the first and second edges for grinding the object into the ground material;

a mixing member supported in the composting chamber above the grinder for rotation about an upright axis relative to the housing so as to be arranged for mixing the ground material above the grinder;

a gearbox having a gearbox housing and a gearbox output shaft supported for rotation relative to the gearbox housing by respective gearbox bearings; and a motor coupled to the gearbox so as to drive rotation of the gearbox output shaft;

the mixer including a drive shaft extending through the bottom end of the composting chamber for rotation relative to the housing of the composing chamber with the mixer about the upright axis;

the gearbox housing being supported in an axial direction of the drive shaft primarily by connection of the gearbox output shaft to the drive shaft of the mixer; and the gearbox housing being coupled to the housing of the composting chamber by a torque member acting primarily to resist rotation of the gearbox housing relative to the housing of the composting chamber about the upright axis of the mixer.

The drive shaft of the mixer may be supported for rotation relative to the housing of the composting chamber by a pair of bearings spaced apart from one another in an axial direction at a location below the bottom end of the composting chamber and spaced above the gearbox housing.

For maintaining an optimum composting temperature within the chamber, there may be provided a heater for providing heat to the composting chamber. The heater is preferably supported adjacent a top end of the composting chamber to protect the heater from damage from the material being ground and mixed in the chamber. To further optimize composting temperature, preferably there is provided a vent in communication with a top end of the composting chamber. The vent may remain open at all times or may be controlled to vent only when excessive heat and/or moisture results from the composting process. A cap member on the vent preferably includes a convex surface to prevent collection of condensate thereon.

BRIEF DESCRIPTION OF THE DRAWINGS

In the accompanying drawings, which illustrate exemplary embodiments of the present invention.

DETAILED DESCRIPTION

Figure 1:
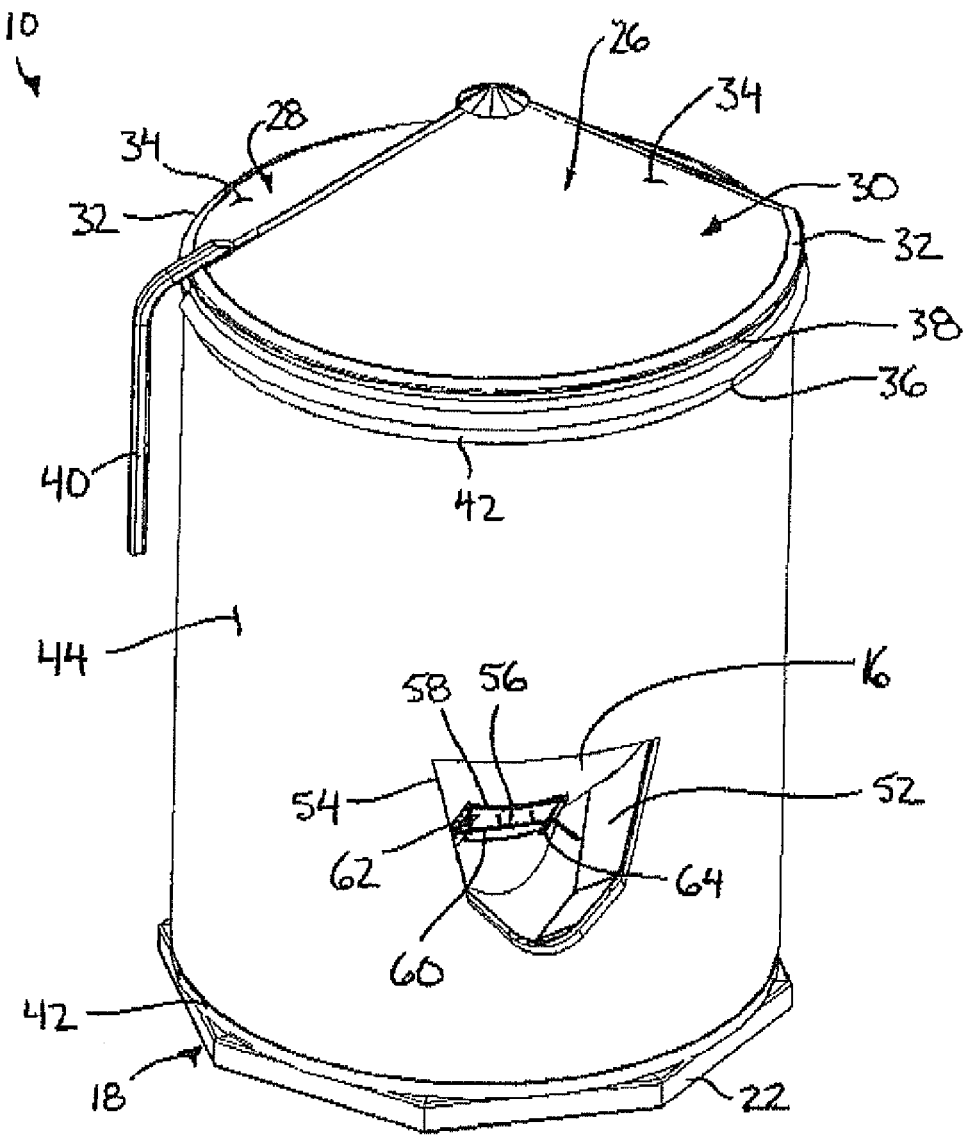
FIG. 1 is a perspective view of a first embodiment of the composter device.
Figure 2:
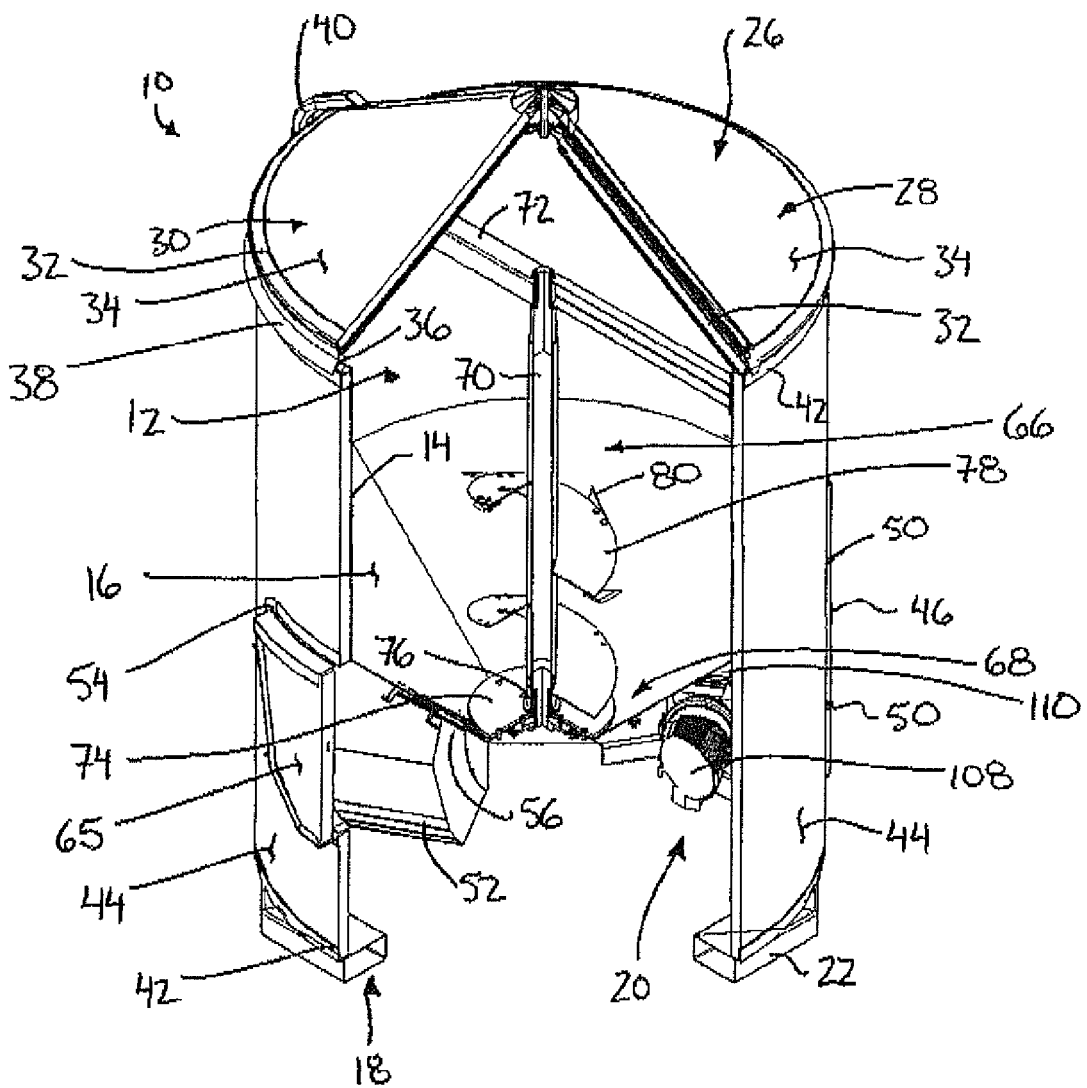
FIG. 2 is a perspective view of the device according to FIG. 1, shown in partial section.
Figure 3:
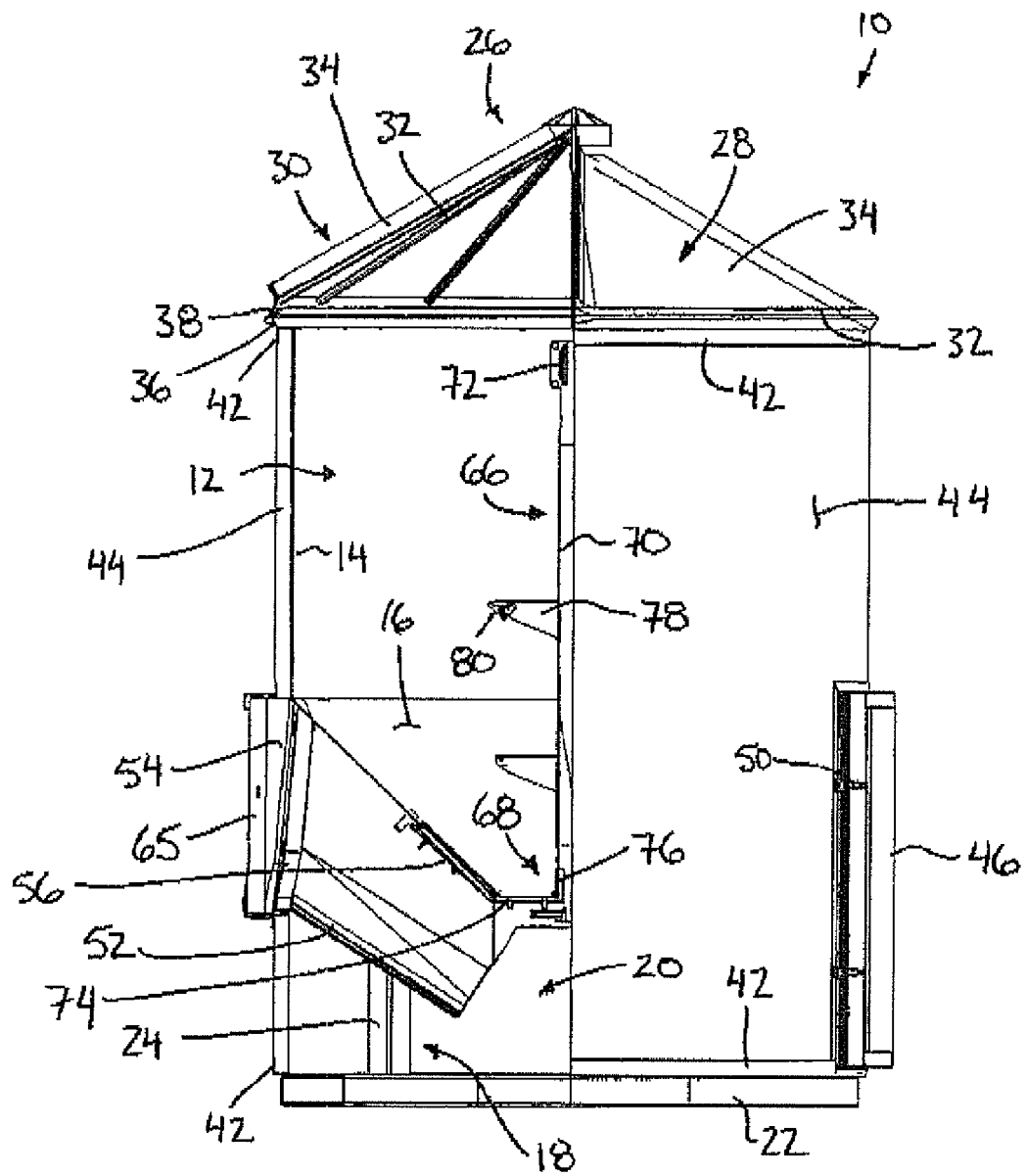
FIG. 3 is a partly sectional side elevational view and FIG. 4 is a bottom plan view of the composter device according to the first embodiment.
Figure 4:
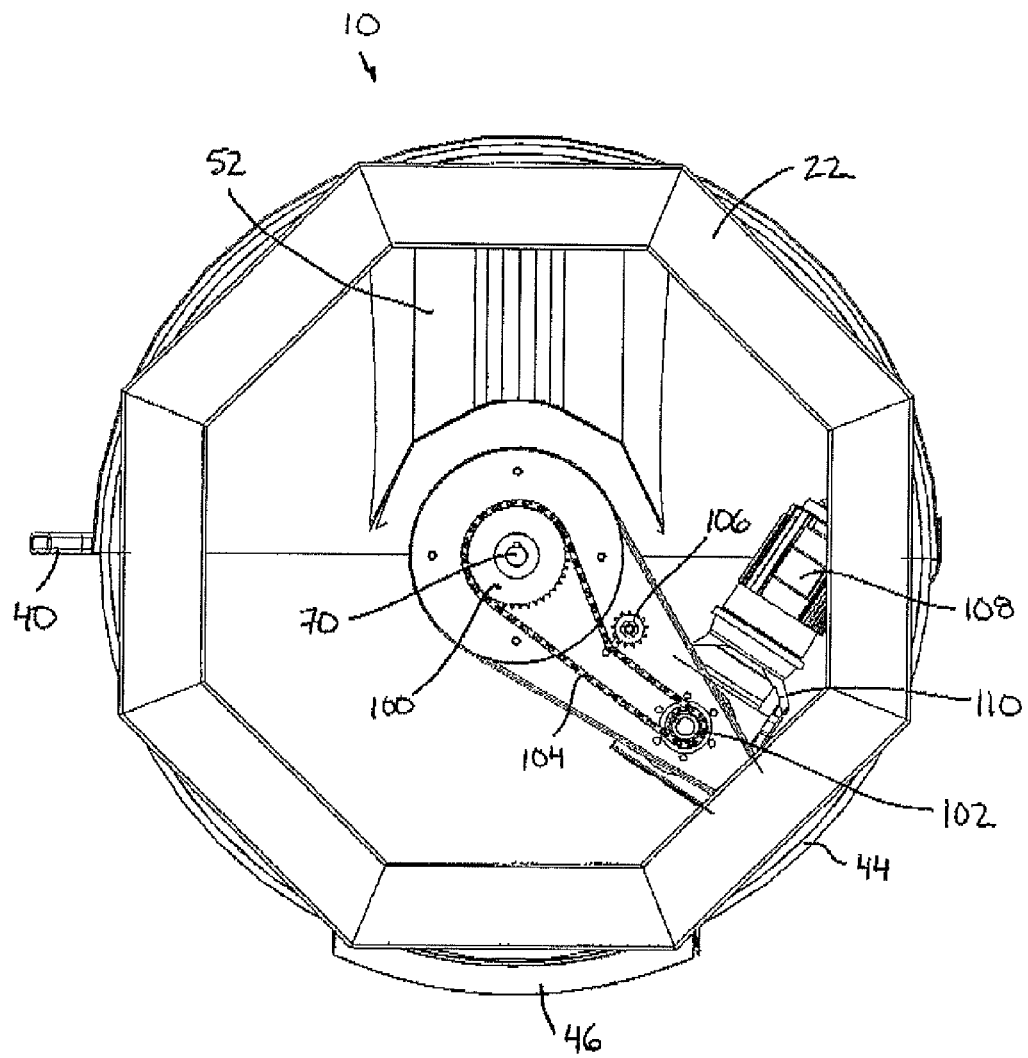
Figure 5:
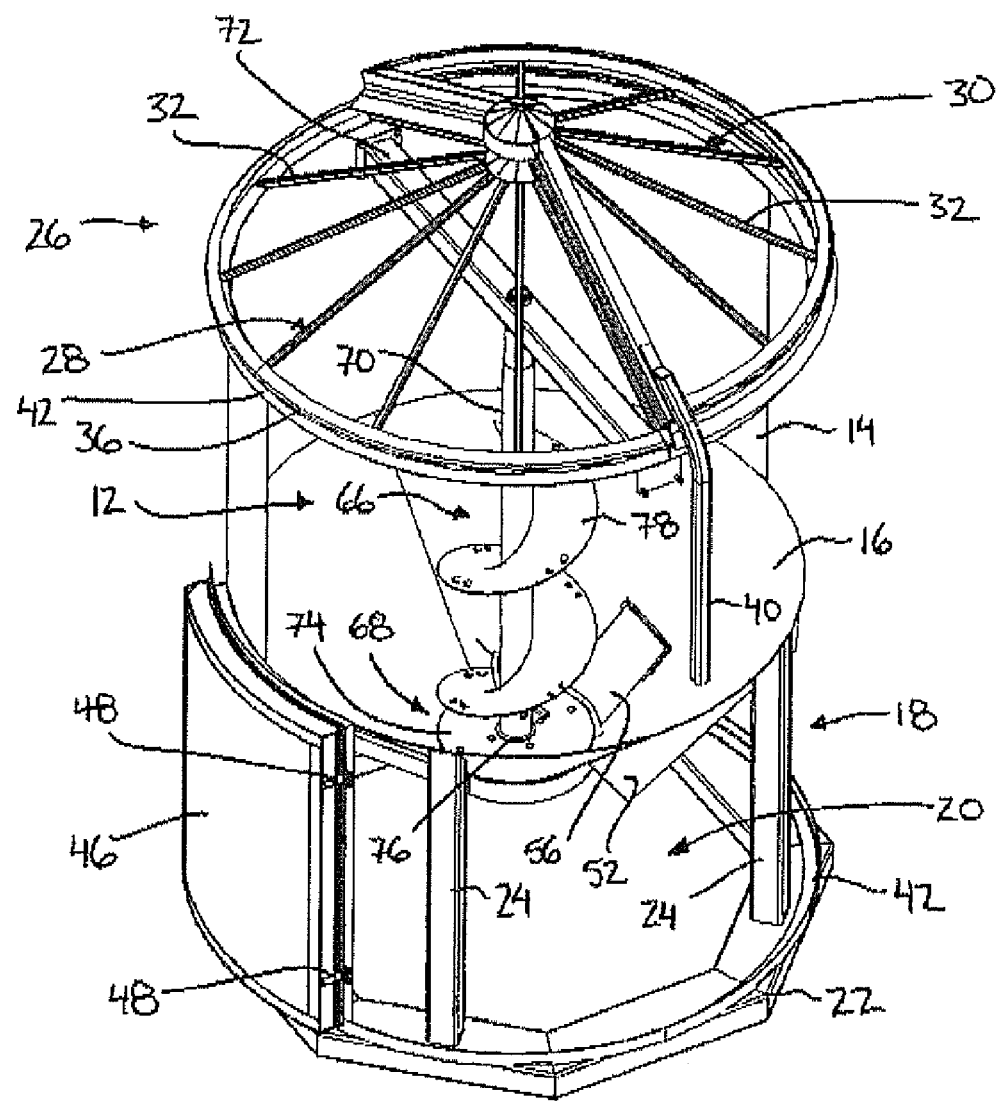
FIG. 5 is a perspective view of the composter device of FIG. 1 in which the walls and lid panels have been removed for viewing the internal components of the composter device.
Figure 7:
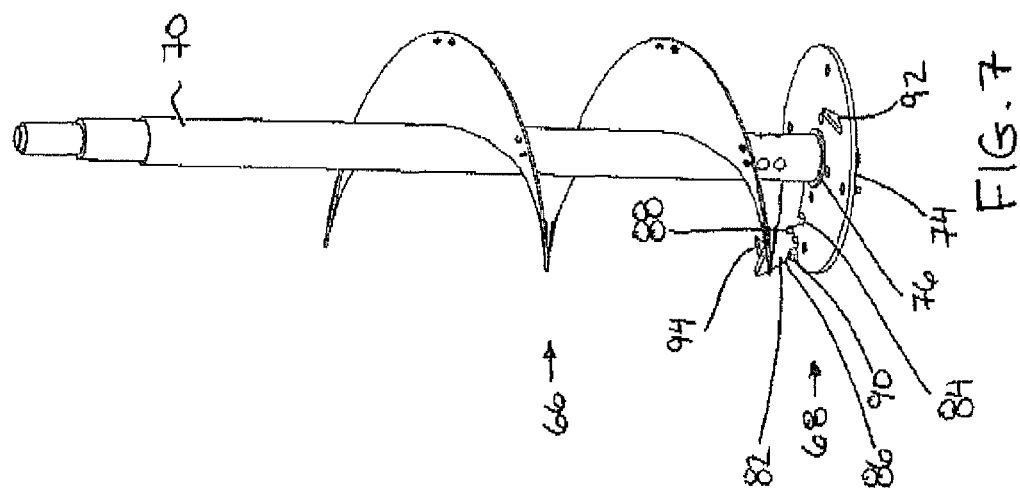
FIGS. 6 and 7 are perspective views of the components of the grinder and the mixer together as viewed from opposing sides respectively in accordance with the first embodiment.
Figure 6:
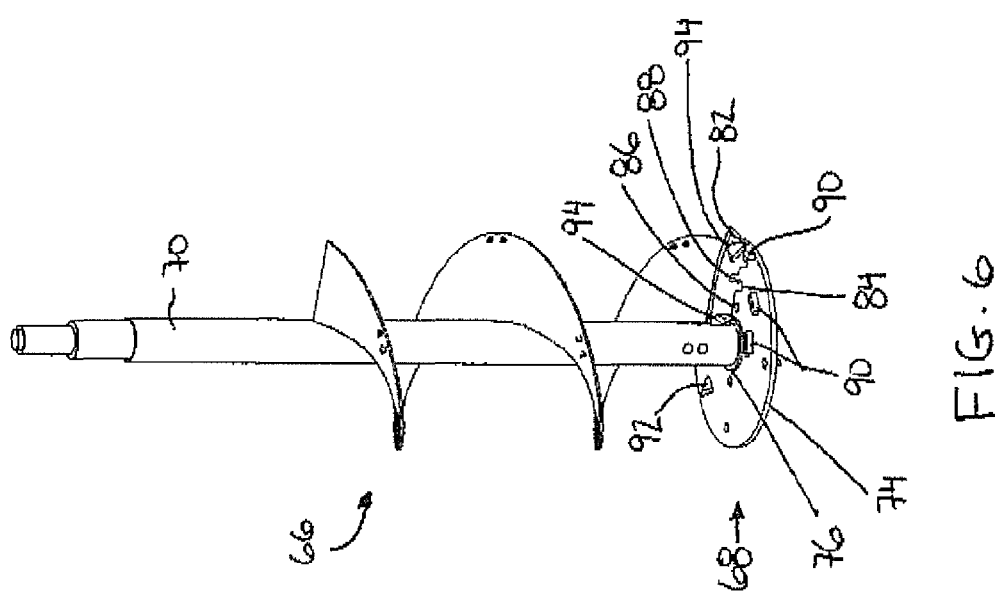
Figure 8:
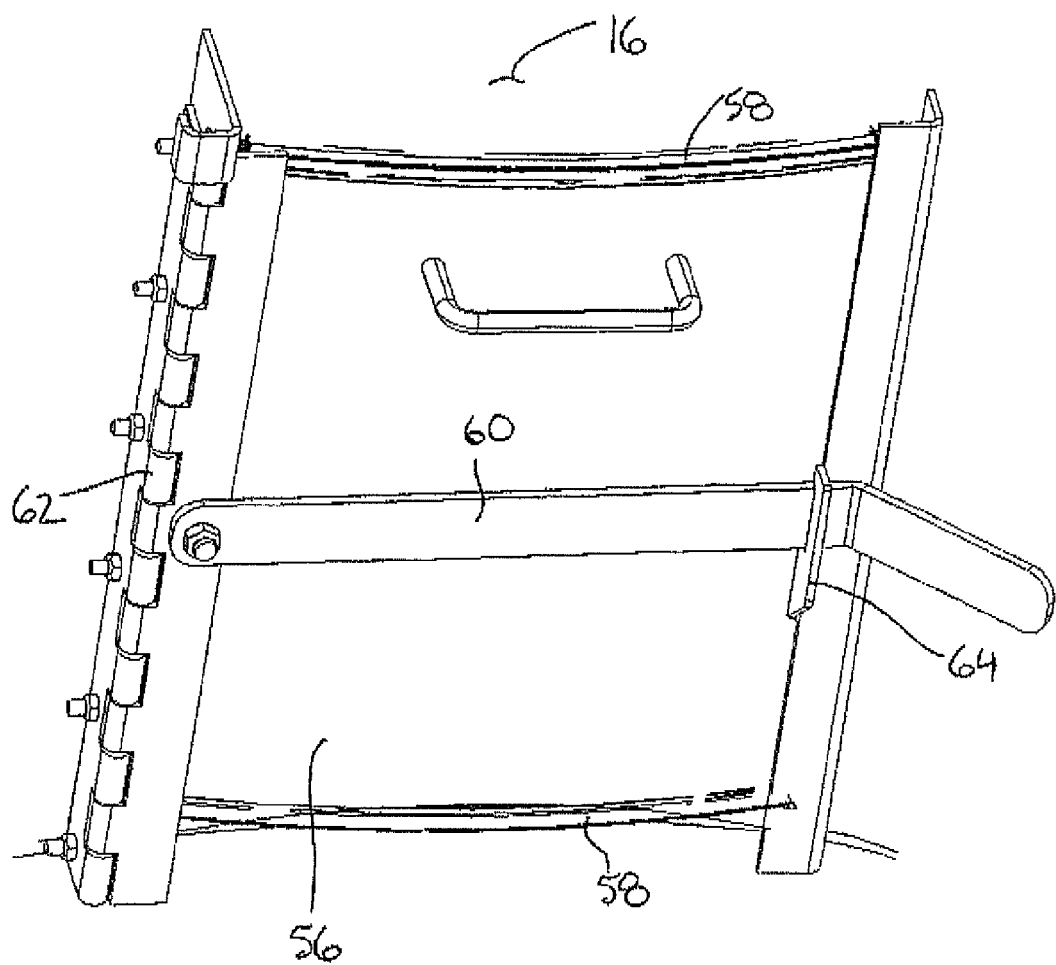
FIG. 8 is a perspective view of a discharge door of the compost chamber according to the composter device of FIG. 1.
Figure 9:
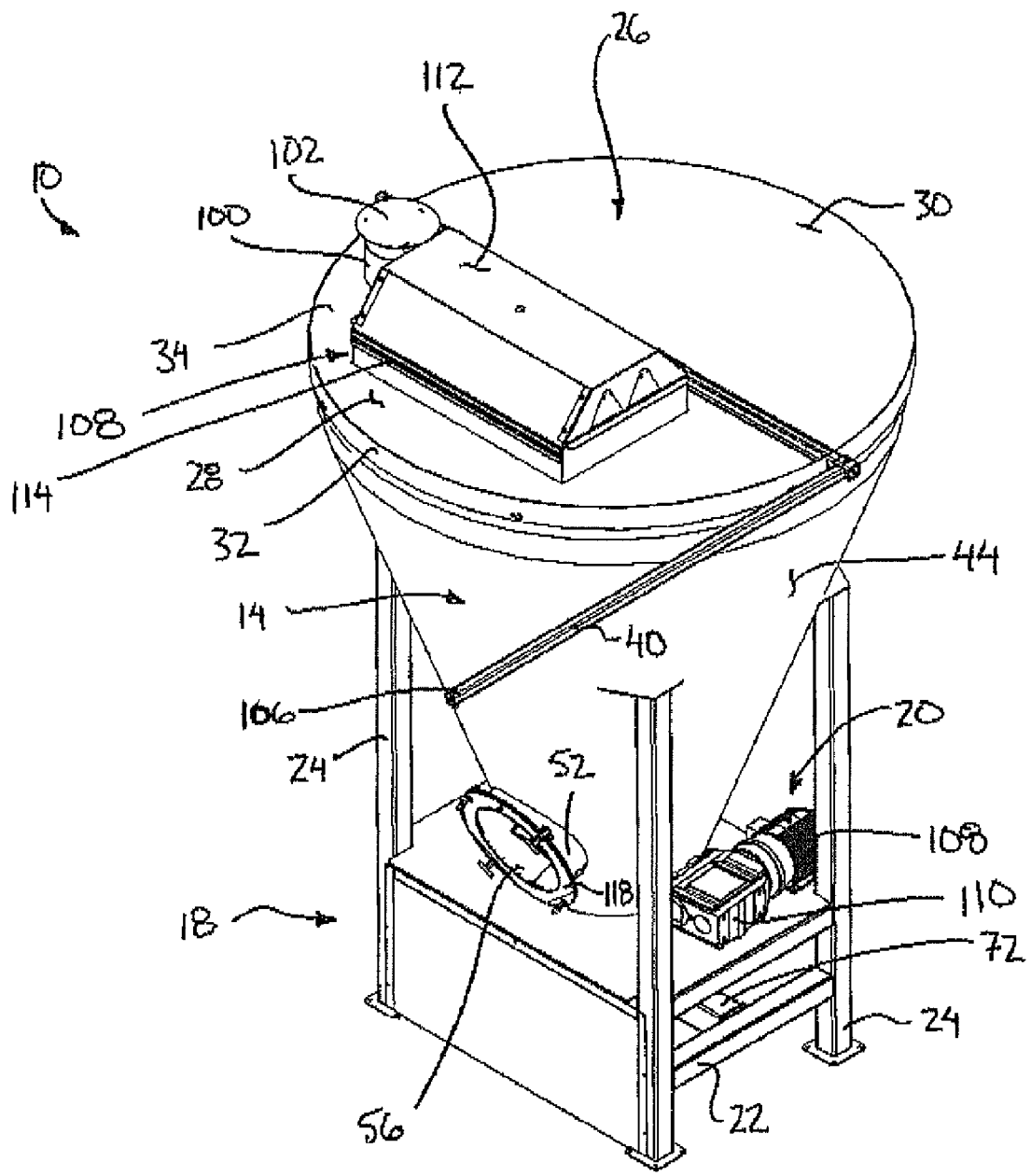
FIG. 9 is a perspective view of a second embodiment of the composter device.
Figure 10:
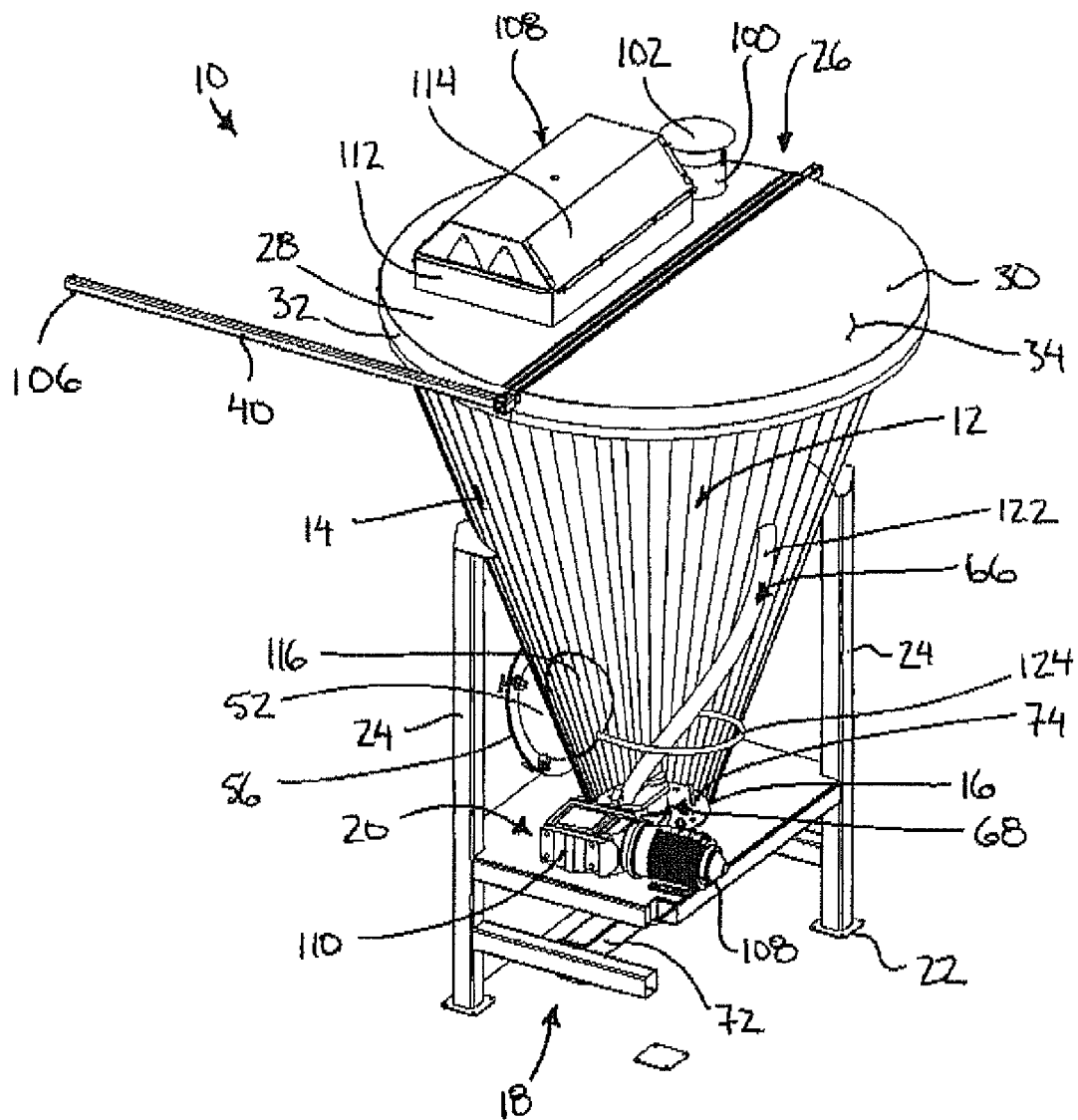
FIG. 10 is a partly sectional perspective view of the device according to FIG. 9, shown from a different direction.
Figure 11:
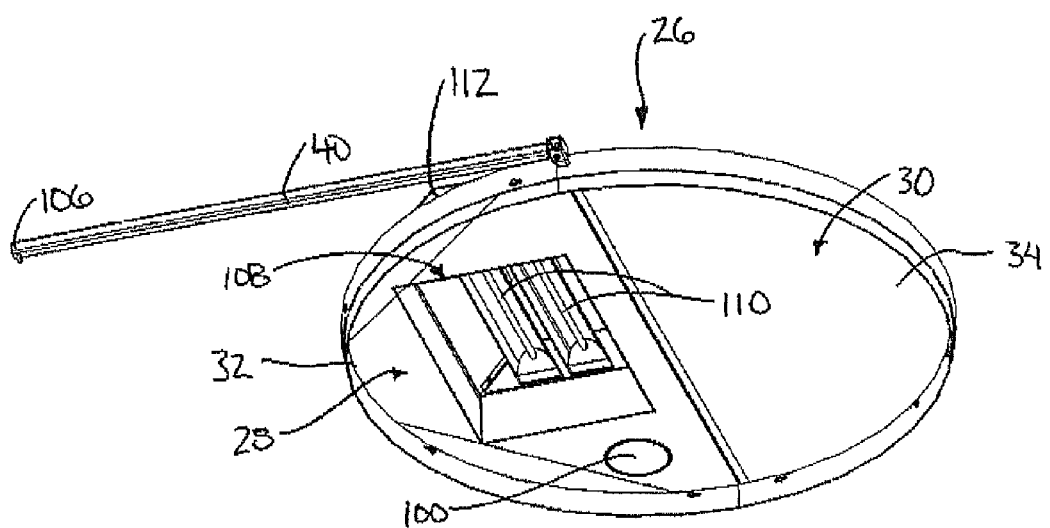
FIG. 11 is a perspective view showing a bottom side of the lid of the composter device according to FIG. 9.
Figure 12:
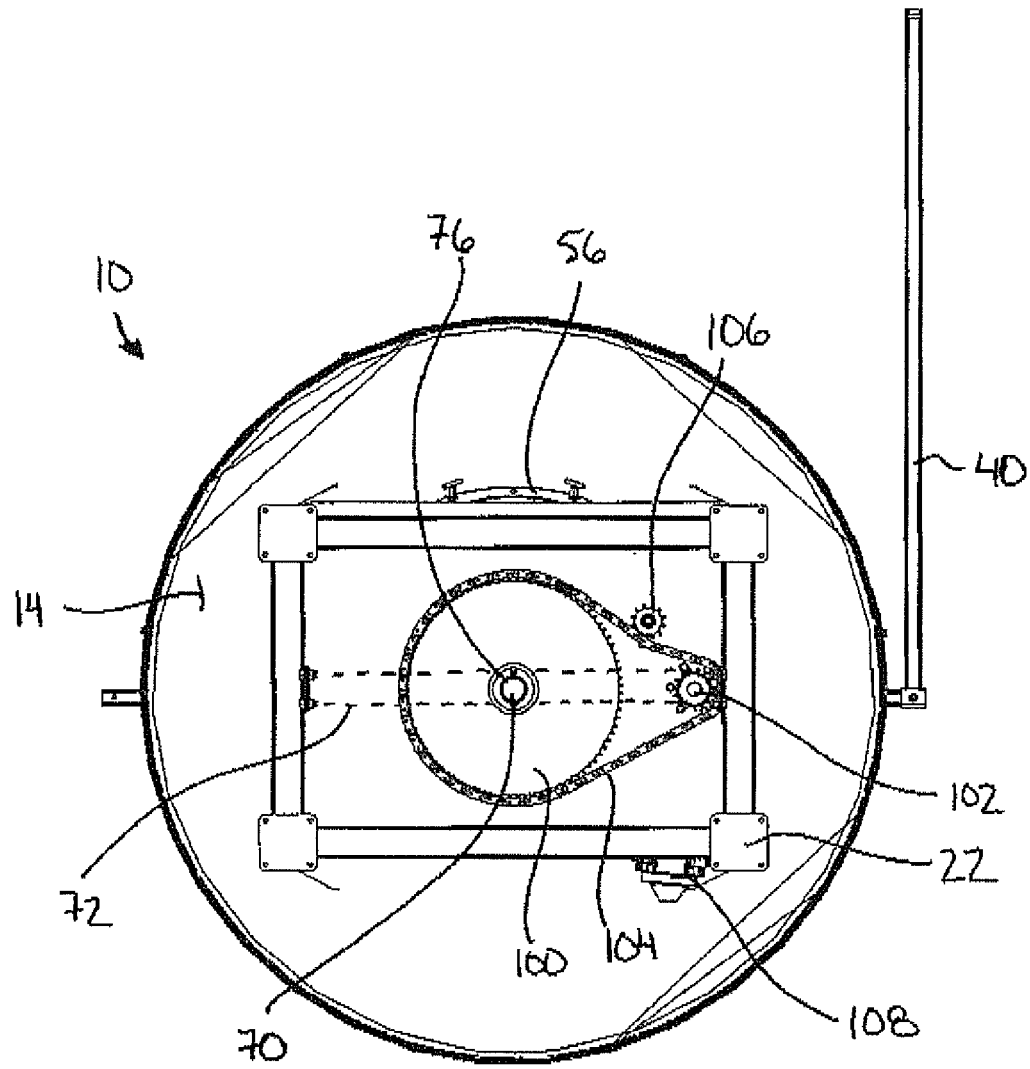
FIG. 12 is a bottom plan view of the composter device according to the second embodiment in which a cross beam of the base has been removed for illustrating the drive components of the mixer.
Figure 13:
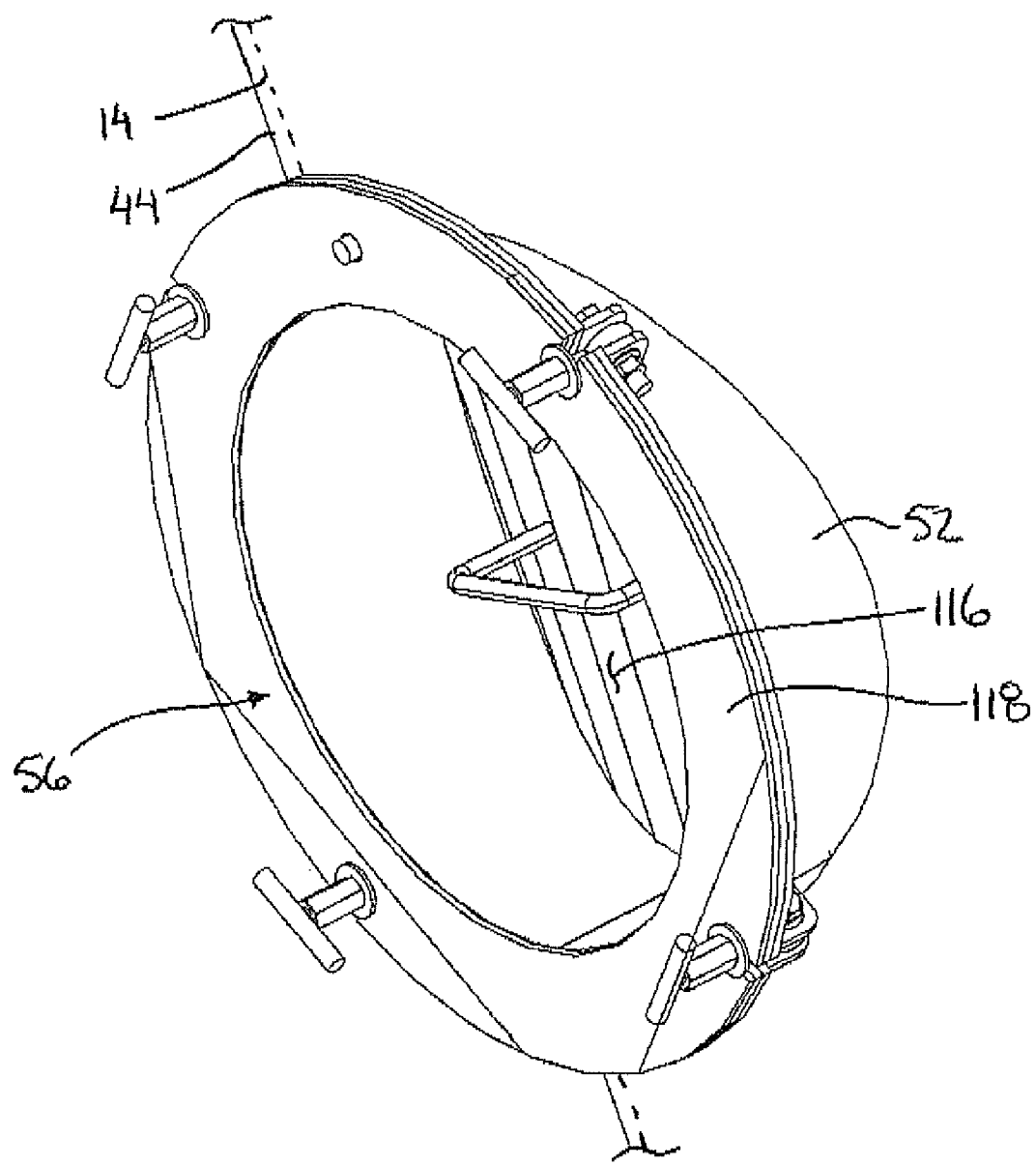
FIG. 13 is an enlarged perspective view of the door at the discharge chute of the device according to FIG. 9.
Figure 14:
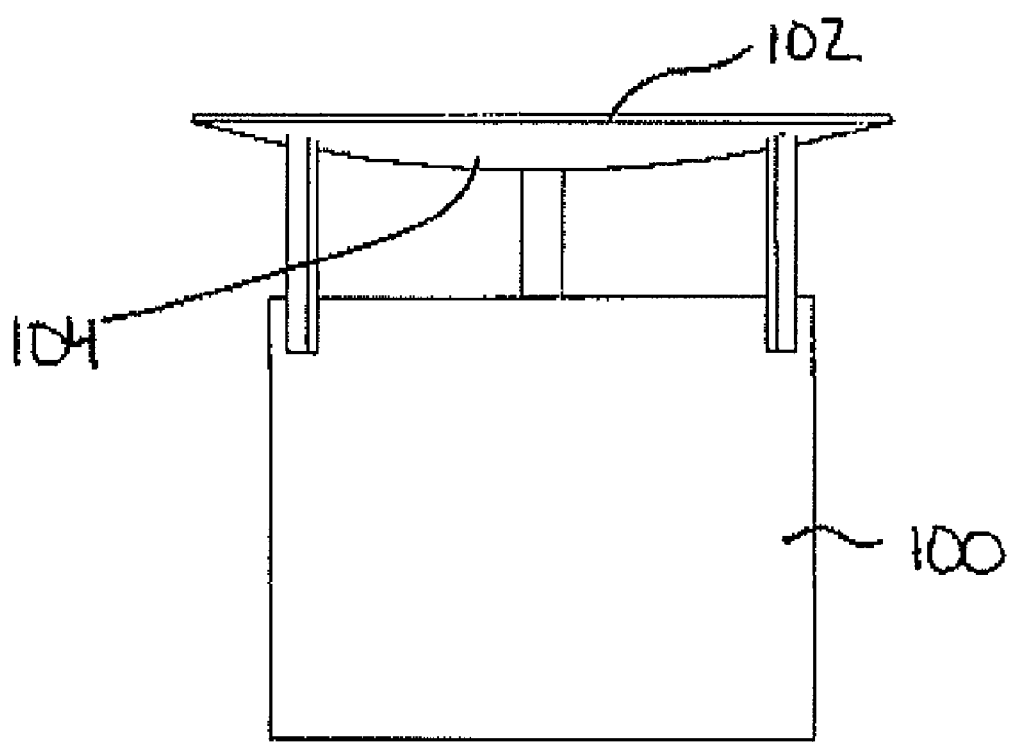
FIG. 14 is a side elevational view of the chimney according to the second embodiment.
Figure 15:
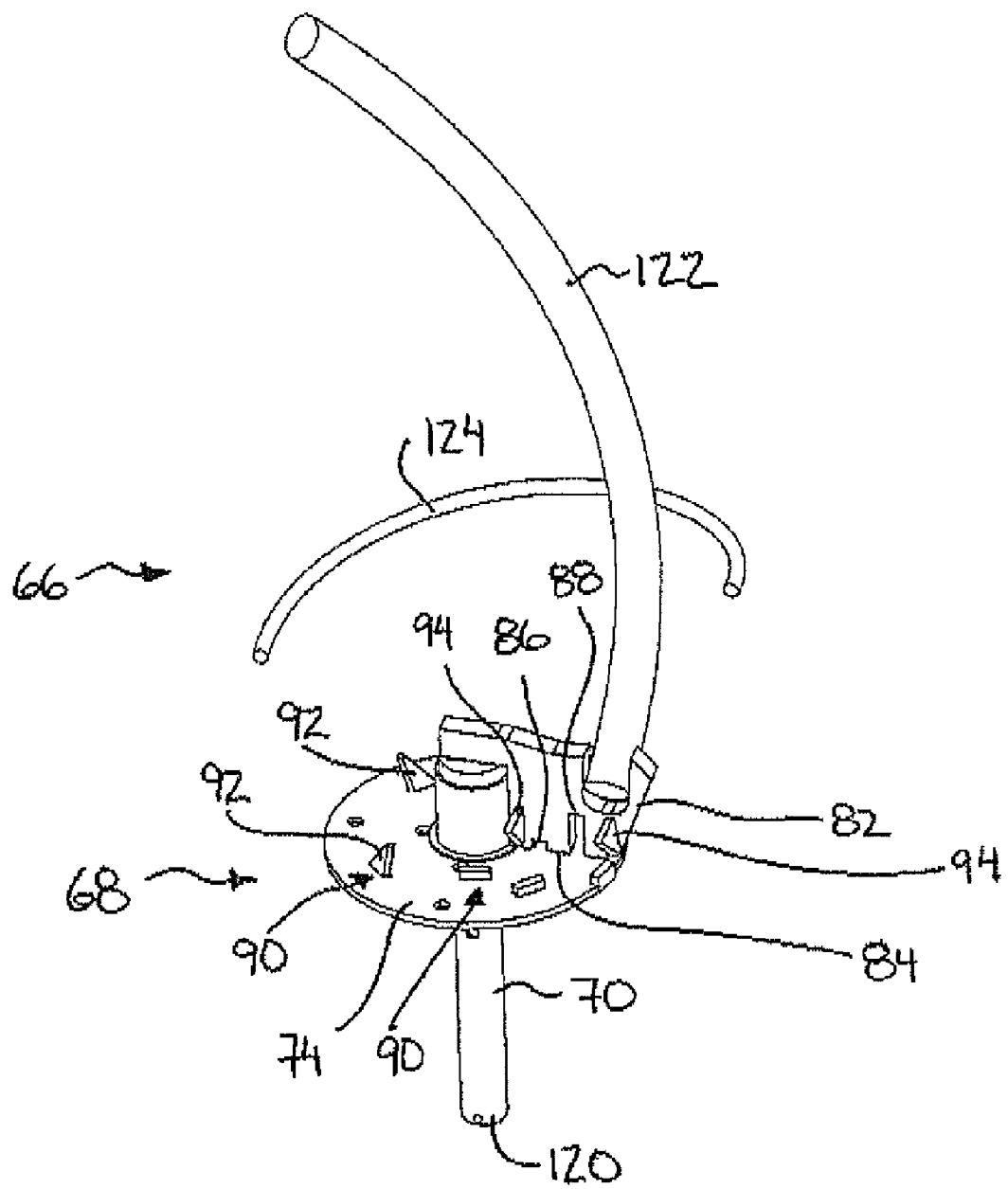
FIG. 15 and FIG. 16 are perspective views from opposing directions of the mixer and grinder according to the second embodiment.
Figure 16:
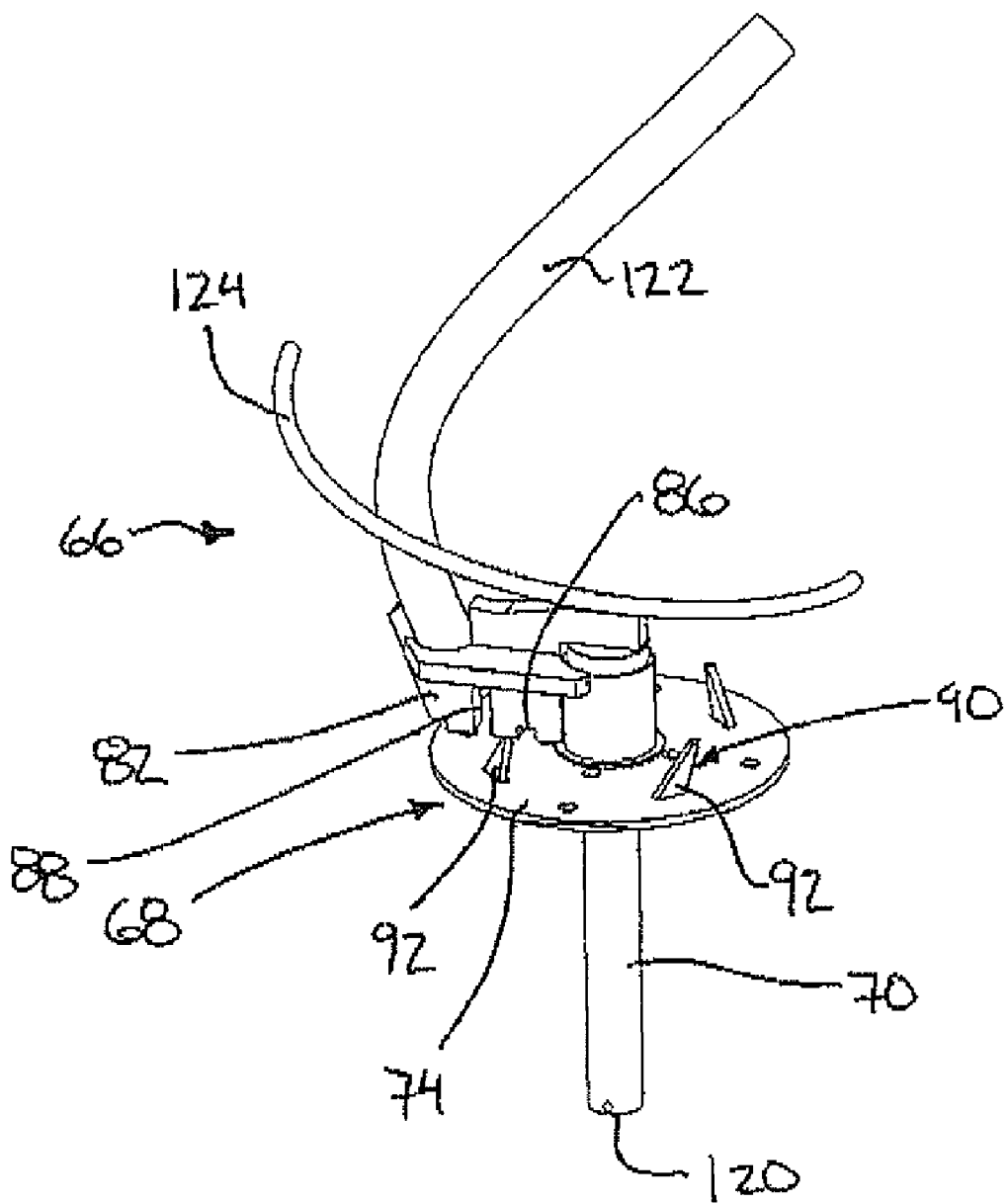

Referring to the accompanying drawings, there is illustrated a composter device generally indicated by reference numeral 10. In the accompanying Figures, similar reference numerals identify similar components on the different embodiments.

The device 10 is particularly suited for composting material which may require some preparation in the form of grinding and the like, for example when composting animal carcasses and the like. The composter device is fully automated and permits matter to be ground and prepared for decomposition in the same chamber as the decomposition process itself while monitoring such parameters as moisture and heat and mixing time in a single unit.

According to a first embodiment, the device includes a housing locating a composting chamber 12 therein. The composting chamber is a cylindrical upright chamber having cylindrical side walls 14 and a floor 16 which is generally conical in shape tapering downwardly and inwardly to a bottom end of the composting chamber.

A frame 18 supports the composting chamber spaced upwardly from the ground to define a control area 20 therebelow. The frame 18 includes an annular base 22 for being supported on the ground. Uprights 24 span vertically between the base 22 and the floor 16 of the composting chamber at spaced positions about a circumference of the annular base 22.

The cylindrical walls 14 of the composting chamber support a lid 26 thereon. The lid is also generally conical in shape so as to taper inwardly and upwardly towards a top end of the composting device. The lid 26 includes a fixed portion 28 and a movable portion 30 which divide the generally conical shape of the lid into two diametrically opposed halves. The movable portion 30 is slightly larger in dimension than the fixed portion 28 so as to permit the fixed portion 28 to be nested within the movable portion when the movable portion is rotated 180 degrees about a central vertical axis of the composter device to overlap the fixed portion in an open position of the lid.

Each of the fixed and movable portions of the lid includes a frame 32 composed of rigid frame members about the periphery and spanning the interior thereof as well as an insulation panel 34 which encloses the panel and fully spans the frame 32. The frame of the fixed portion 28 is fixed on the top side of the cylindrical walls of the composting chamber. The movable portion is pivoted at an apex of the lid 26 and remains slidable at the periphery on an annular frame member 36 encircling the top end of the cylindrical walls 14 and also supporting the fixed portion 28 of the lid thereon. Sealing material is provided at the intersection of the movable portion and the fixed portion as well as about the peripheral edge of the movable portion to fully enclose the top end of the composter device when the fixed and movable portions are positioned side by side in the conical configuration illustrated in FIG. 1.

A handle 40 is secured to the frame of the movable portion 30 of the lid to extend outwardly and downwardly along side the composter device to a free end spaced above the ground which can be readily grasped by an operator of the composter device. Opening and closing of the lid is thus accomplished by sliding the movable portion 30 over top of the fixed portion by manually engaging the handle 40 and walking about a circumference of the composter device approximately 180 degrees.

The annular frame member 36 about the top of the cylindrical walls of the composting chamber and the annular base 22 of the frame of the composter device each include a suitable retaining flange 42 for retaining a cylindrical wall of insulation 44 which fully surrounds the composter device 10. Both the control area and the composting chamber thereabove are surrounded by the insulation 44.

An access door 46 is located in a side of the composter device for communication through the wall of insulation 44 to access the interior of the control area. The access door is similarly formed with frame members and insulation spanning thereacross. Hinges 48 are provided on one side of the door while latches 50 on the opposing side secure the door in a closed position.

A discharge chute 52 communicates through the wall of insulation 44 below the composting chamber and diametrically opposite to the access door 46. The discharge chute is an inclined trough extending at a downward and inward incline along a bottom side of the conical floor 16 of the composting chamber from an outlet hatch 54 supported in the wall of insulation 44 to a door 56 formed in the floor 16 of the composting chamber adjacent the bottom end thereof.

The door 56 generally comprises a rigid rectangular panel which fits over the door opening formed in the floor with the edges of the panel overlapping the outer surface of the floor with a sealing material 58 engaged between the panel and the floor. The panel is held frictionally engaged against the door opening by a latch bar 60 arranged to permit the door 56 to be removed when the latch is released. The latch bar 60 generally comprises an elongate bar which is pivoted to a hinge 62 extending along one side of the door opening. The latch bar 60 is of suitable length to span the width of the door panel for being selectively received by a retaining lug 64 on an opposing side of the door opening when in a closed position. By manually releasing the free end of the latch bar 60 from the retaining lug 64, the latch 60 is free to be pivoted with the hinge 62 away from the door opening so that the door 56 is free to be released and removed from the composter device.

A cover 65 mounts at the opening of the discharge chute through the wall of insulation 44. The cover 65 includes rigid frame elements and insulating materials spanning thereacross in a construction similar to the previously noted external components of the composter device. When the cover 65 is removed, the discharge chute 52 is suitably sized to receive the feed end of a discharge auger therein for unloading the composter device with an auger as desired.

Components of a mixer 66 and a grinder 68 are supported on a working shaft 70 of the composter device. The working shaft extends vertically through a center of the composter device, co-axially with the walls of the composting chamber and the conical floor 16. A cross beam 72 spans diametrically across a top end of the composting chamber for pivotally supporting a top end of the working shaft 70 therein. A flat circular base plate 74 is mounted at the bottom of the conical floor 16 so that the door 56 of the discharge chute is positioned directly adjacent the base plate. Suitable bearings 76 are supported in the base plate 74 for centrally locating the bottom end of the working shaft 70 to extend therethrough.

The mixer 66 generally comprises an auger flighting 78 fixed about the shaft for rotation therewith. The flighting spirals upwardly from a bottom end directly adjacent the base plate 74 to a top end terminating at an intermediate point in a height of the composting chamber. Rotation of the working shaft 70 is oriented to urge material in the composting chamber upwardly at a center of the chamber along the mixer 66 in a working direction of the rotation of the shaft. The overall diameter of the flighting 78 is small in relation to the diameter of the composting chamber 12.

A plurality of blades 80 are positioned at spaced positions about the periphery of the flighting 78. Each blade is secured by threaded fasteners to the fighting spaced circumferentially approximately 90 degrees from adjacent ones of the blades 80. In the first illustrated embodiment, the blades project forwardly and outwardly into the direction of rotation however due to the threaded connection of the blades to the fighting, blades of varying aggressive angles relative to the direction of rotation may be provided and replaced as desired.

The grinder 68 includes a first grinding element 82 which is mounted on the working shaft 70 for rotation with the fighting in the shaft directly below the mixer at the bottom end of the flighting and directly adjacent the base plate 74. The first grinding element 82 thus comprises a rigid bar having a bottom edge 84 which rides along the base plate 74 which is fixed in position at the bottom of the composting chamber 12. A set of horizontal slots 86 are provided along the bottom edge to provide an opening at each slot between the grinding element 82 and the plate. At least one vertical slot 88 is also provided and intersects one of the horizontal slots 86 in the illustrated embodiment.

A plurality of second grinding elements 90 remain fixed on the base plate 74 for co-operation with the slots 86 and 88 formed in the first grinding element 82. Each second grinding element 90 comprises a fixed lug in radial alignment, relative to the working shaft, with the horizontal slots 86 and vertical slot 88 respectively. The lugs are suitably sized for a close tolerance fit between the edges of the second grinding elements 90 and the slots formed in the first grinding element 82 to produce a shearing action therebetween when the first grinding element is rotated with the shaft relative to the second grinding elements which remain fixed on the base plate.

The second grinding elements 90 are located at spaced circumferential positions about the shaft for being received through respective slots in the first grinding element at different points of rotation thereof. A vertical grinding element 92 is provided fixed on the base plate 74 for alignment with the vertical slot 88 and includes a sharpened knife edge which confronts the first grinding element 82 at an upward incline towards the first grinding element as the first grinding element is moving towards the vertical grinding element 92 in operation. The inclined edge provides some grip to retain matter to be crushed, for example bones from an animal carcass, during a grinding cycle of the composter device.

Guide teeth 94 are supported at spaced positions on the first grinding element to project into the direction of travel above the slots 86. A forward facing leading edge of the guide teeth 94 projects at a downwardly and inward incline towards the first grinding element for guiding material to be ground downwardly into the slots of the first grinding element. Accordingly as the first grinding element is rotated the matter urged in front of the slots 86 and 88 are crushed by the shearing action of the second grinding elements fixed on the plate rotated through the slots.

The flighting 78 of the mixer 66 and the first grinding element 82 of the grinder 68 are commonly driven on the working shaft 70 which projects below the base plate 74 through the bearing 76 to a bottom end within the control area 20 where a horizontal driven gear 100 is supported on the shaft. The driven gear is coupled to a driving gear 102 by a suitable drive chain 104. An idler gear 106 is provided on a chain tightener to remove slack from the drive chain 104 coupling the driving gear 102 to the driven gear 100. A motor 108 drives a gearbox 110 coupled to the driving gear 102 to provide suitable torque for driving rotation of the grinder to crush matter including bones of an animal carcass and the like.

The control area also locates heating elements (not shown), an air pump (not shown) and a water supply (not shown) for providing heat, fresh air and moisture to the interior of the composting chamber as required to maintain optimum conditions for composting therein. Activation of the air pump provides fresh oxygen for micro-organisms in the composting chamber to consume and assist in the decomposition process. Pumping fresh air into the composting chamber can also affect temperature within the chamber by cooling the compost mixture or by accelerating the decomposition process which produces heat.

The heating elements, the air pump and water supply are conventional equipment that work in co-operation with commercially available temperature, oxygen and moisture sensors (not shown) respectively located in the composting chamber which provide information to a suitable controller (not shown) which respectively determines activation of the heating elements, activation of the air pump and dispensing of water through nozzles of the water supply. This ensures sufficient heat, oxygen and moisture to optimize the decomposition of the matter to be composted by micro-organisms. The controller also controls activation of the motor 108 to provide periodic activation of the mixer 66 to circulate the material in the composting chamber to improve air circulation and evenly distribute micro-organisms to further optimize the composting process.

In further variations, the air pump alone may be used to control either the temperature or the moisture content by activation of the air pump in response to detection by a thermostat that temperature is not within an ideal range or that too much moisture is present such that the matter to be composted requires drying.

According to a second embodiment, the device 10 similarly comprises a housing locating a composting chamber 12 therein. The chamber in this instance is generally conical in shape in which the side walls 14 are sloped downwardly and inwardly continuous with the floor to the bottom end of the composting chamber. The frame 18 similarly supports the composting chamber above a base 22 supported on the ground. Accordingly a similar control area 20 is provided below the compositing chamber for supporting operating components of the composter device. The uprights 24 of the frame span vertically between the base and the walls 14 of the composting chamber at circumferentially spaced positions about the chamber.

The walls 14 of the composting chamber similarly support the lid 26 thereon which is round in shape to span the top end of the composting device. The lid according to the second embodiment also includes the fixed portion 28 and the movable portion 30 which divide the lid into two diametrically opposed halves in which the fixed portion remains fixed relative the housing while the movable portion 30 is pivoted into an open position. The movable portion 30 is hinged relative to the fixed portion along a diametrically and horizontally extending hinge so that the movable portion is pivoted upwardly into the open position. Each of the fixed and movable portions 28 and 30 of the lid includes a peripheral frame 32 composed of rigid members and a panel 34 enclosing the lid which is insulated. Sealing material is provided at an intersection of the movable portion with the fixed portion and the open top edges of the composting chamber to fully enclose the top end to the composter device when fixed and movable portions are positioned side by side as shown in the accompanying Figures.

A vent 100 is provided on the fixed portion of the lid to vent excess heat and moisture from the composting chamber during the composting process. The vent 100 generally comprises an upright collar in communication with a through opening in the fixed portion of the lid which includes an open top end. A lid member 102, which is generally circular of equal or greater diameter than the collar, is positioned directly above the open top end of the collar spaced slightly thereabove to define a gap through which air can be vented. The lid member 102 includes a domed inner surface 104 which is convex in profile so that moisture condensing thereon is encouraged to drip toward the center of the lid member 102 for falling back into the composting chamber rather than accumulating as ice on the lid member in colder climates. The lid member 102 is supported spaced above the collar defining the vent 100 by suitable leg members at circumferentially spaced positions there about.

The handle 40 according to the second embodiment comprises an elongate arm which is fixed onto the movable portion 30 of the lid to extend horizontally outward from the movable portion towards the fixed portion, perpendicularly to the hinge, adjacent one end thereof and spaced radially outward sufficiently that the handle clears the housing of the composting chamber when it is pivoted downwardly. The handle 40 lies on a common plane with the movable portion so that the movable portion is pivoted upwardly into the open position as the handle is pulled downwardly at the free end 106. A suitable rope or chain may be connected to the free end 106 for being suspended therefrom in such a manner that the handle is more readily grasped by a person trying to open the lid while standing on the ground.

A heater 108 is supported in the fixed portion of the lid at the top end of the composting chamber. The heater 108 includes a pair of heating elements 110 which are supported within an external housing 112 of the heater for communication through an opening in the fixed portion of the lid to which the exterior housing 112 is sealed. The external housing 112 includes a hinged access panel 114 which permits access to the heating elements 110 from an external side of the lid so that the heating elements can be readily serviced as desired. Location of the heater in the lid at the top end of the composting chamber protects the components of the heating elements from damage due to the churning material to be composted. The insulation 44 is sprayed on in the second embodiment to provide a full coating about the exterior of the housing for maintaining heat within the composting chamber in colder climates.

The second embodiment also includes the discharge chute 52 which communicates through the wall of insulation 44 to communicate with the bottom discharge opening in the wall of the composting chamber. The chute extends downward and outward at an incline from the conical shaped wall 14 adjacent the bottom side thereof.

A door 56 is similarly provided for closing the discharge chute. The door 56 according to the second embodiment comprises a one piece plug including a flush interior panel 116, a tubular body for being slidably received in the discharge chute and an outer rim flange 118. The outer rim flange 118 sandwiches a layer of rubber sealing material between itself and a cooperating flange at the free end of the discharge chute. Suitable clamping members are provided at circumferentially spaced position about the outer flange 18 for clamping the rubber sealing material between the door 56 and the discharge chute 52 which the door encloses. The flush interior panel 116 is flush with the opening formed in the wall 14 of the composting chamber.

The second embodiment similarly includes the mixer 66 and the grinder 68 which are supported on the working shaft 70 for rotation together about a vertical axis extending through the center of the floor of the composter device coaxially with the conical walls of the composting chamber. The cross beam 72 in the second embodiment spans diametrically across the base 22 of the device for pivotally supporting the free bottom end 120 of the working shaft 70. A flat circular base plat 74 is similarly mounted above the shaft at the bottom of the composting chamber, but at the top end of the working shaft 70. Suitable bearings 76 and a sealing member are similarly supported in the base plate 74 for centrally locating the working shaft therethrough in sealing engagement about the shaft.

The mixer 66 according to the second embodiment generally comprises a sweep arm 122 fixed to the shaft 70 for rotation therewith. The arm 122 spirals upwardly from a bottom end directly adjacent the base plate 74 to a top end terminating at an intermediate point in a height of the composting chamber in a direction which slopes upwardly and away from the direction of rotation in operation. The sweep arm 122 is adjacent the peripheral wall of the composting chamber throughout the length thereof from a gap of approximately one quarter of an inch adjacent the base plate 74 to a maximum gap of approximately one and a half inches adjacent the free top end thereof.

Rotation of the working shaft 70 is similarly oriented to urge material in the composting chamber upwardly at a periphery of the chamber along the mixer 66 in a working direction of the shaft rotation. The overall diameter of the rod forming the sweep arm 122 is approximately three inches so as to be considerably smaller in size and relation to the diameter of the composting chamber 12. A ramp bar 124 is mounted at a fixed position on the peripheral wall of the composing chamber at an intermediate position along the length of the sweep arm 22. The ramp bar 124 is an elongate member extending circumferentially partway about the composting chamber so as to slope upwardly in the direction of the sweep arm 122 sweeping past the bar 124. The bar has a thickness in the order of one inch to substantially fill the gap between the sweep arm 122 and the peripheral wall of the composing chamber at a point of contact therebetween.

The components of the grinder 68 in the second embodiment are substantially identical to those of the first embodiment in which first grinding elements are mounted on the working shaft 70 for rotation with the mixer, below the mixer, at the bottom end of the composting chamber directly adjacent the base plate 74. The first grinding element 82 generally comprises a rigid plate extending radially outward in an upright orientation which supports the sweep arm 122 thereon. A suitable gusset is provided at a trailing side of the grinding element 82 for providing additional structural support to the sweep arm 122.

Slots 86 and 88 are similarly provided along the bottom edge of the first grinding element for cooperation with second grinding elements 90 which remain fixed on the base plate 74 as described in accordance with the first embodiment. Accordingly the second grinding elements similarly comprise lugs which produce a sheering action when the slots of the first grinding element are rotated past the second grinding elements. The second grinding elements are located at spaced circumferential positions about the shaft. A plurality of vertical grinding elements 92 are also provided, each having a knife edge inclined upwardly into the direction of rotation to confront the first grinding element as described above. Guide teeth 94 are also provided on the first grinding element as described above with regard to the first embodiment.

The sweep arm 122 and the first grinding element are commonly driven on the working shaft 70 by the horizontal driven gear 100 supported on the shaft below the base plate 74. A driving gear 102, a drive chain 104 and the idler gear 106 of the first embodiment are all similarly arranged for being driven by a motor 108 and gear box combination.

Figure 17:
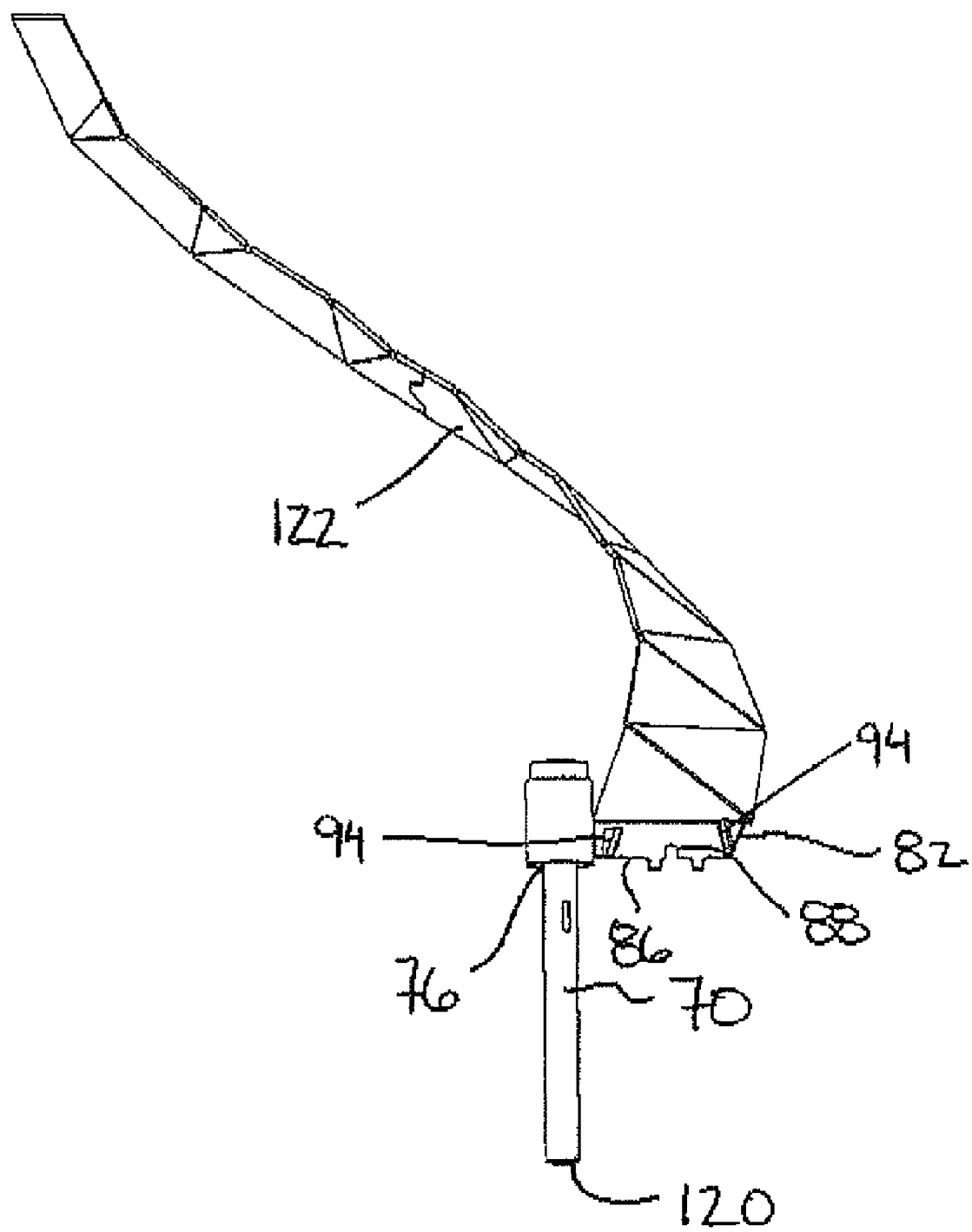
FIG. 17 is a front elevation view of a further embodiment of the mixer.

Turning now to FIG. 17, a further embodiment of the sweep arm 122 is illustrated which similarly spirals upwardly adjacent a periphery of the composting chamber walls to be sloped upwardly and away from the direction of rotation of the shaft. The sweep arm 122 according to the embodiment of FIG. 17 comprises a broad plate member, as opposed to a solid rod, which is close in tolerance to the wall of the composting chamber to provide a minimum gap therebetween.

The broad flat surface assists in churning the material to be composted by encouraging the material to ride up the broad flat surface of the sweep arm 122 as the arm is rotated about the periphery of the composting chamber. No ramp bar is thus required in this instance.

Turning now to the embodiment of FIGS. 18 through 22, the configuration of the composting chamber 12 in this instance is substantially identical to the previous embodiment with the exception of the details of the sweep arm 122 of the mixer 66 and the manner of supporting the gearbox 110 and the motor 108. As in the previous embodiment the chamber is surrounded by a conical side wall 14 tapering downwardly and inwardly to a horizontal and circular base plate 74 of the chamber. The chamber is supported by a base frame 22 and includes a lid having a similar configuration of vents, heater and pivoting lid as previously described. The side walls are similarly insulated with a similar discharge chute 52 being provided adjacent the bottom end of the chamber.

The mixer 66 according to the embodiment of FIGS. 18 through 22 is again supported on a drive shaft 70 extending through the base plate 74 at the bottom of the chamber for rotation about the common vertical axis of the mixer and grinder. The sweep arm 122 in this instance is also positioned adjacent the conical wall so as to extend generally in a spiral pattern upwardly away from the direction of rotation from the bottom end to the top end thereof which again comprises a free unsupported end at an intermediate location between the top and bottom ends of the chamber. Accordingly, the mixer remains open and unobstructed along the vertical axis of rotation between top and bottom ends of the mixer as well as the top and bottom ends of the composing chamber as in previous embodiments. The outer diameter of the sweep arm, or radial distance from the axis is arranged to increase with increasing distance from the bottom end of the chamber so as to be in proximity to the peripheral conical side wall 14 along the full height of the sweep arm 122 also as in previous embodiments.

The grinder 68 in his embodiment is also similar to previous embodiments in that there is provided a first grinding element 82 in the form of a rigid member extending in a radial direction from the bottom end of the mixer at the axis. The rigid member forming the first grinding element spans the full radial dimension of the base plate 74 between the axis and the conical side wall 14 joined to the periphery of the base plate 74. The rigid member of the first grinding element 82 is directly against the base plate such that the slots 86 of the first grinding element are open to the bottom end of the rigid member adjacent the base plate 74. Each slot 86 extends fully through the first grinding element in a circumferential direction from a first side to a second side of the flat plate forming the rigid member. The second grinding elements 90 in this embodiment also comprise lugs at circumferentially spaced positions on the base plate 74 such that the lugs are fixed and stationary relative to the base plate and surrounding side wall of the composting chamber.

The edges of the second grinding elements are arranged for a close tolerance fit relative to the edges of the first grinding element as the second grinding elements pass fully through the slot in the first grinding element in the circumferential direction from the first side to the second side of the first grinding element during operation of the grinder when the first and second grinding elements are rotated relative to one another about the common vertical axis of the chamber. The corresponding edges of the first and second grinding elements which rotate past one another are arranged to pass in sufficiently close proximity so as to produce a shearing action, otherwise known as a scissor-like cutting action between the confronting edges of the slot of the first grinding element and the lug of the second grinding element. The inclined orientation of the lugs as described in the previous embodiment further enhances the scissor-like cutting action between the first and second grinding elements.

Figure 18:
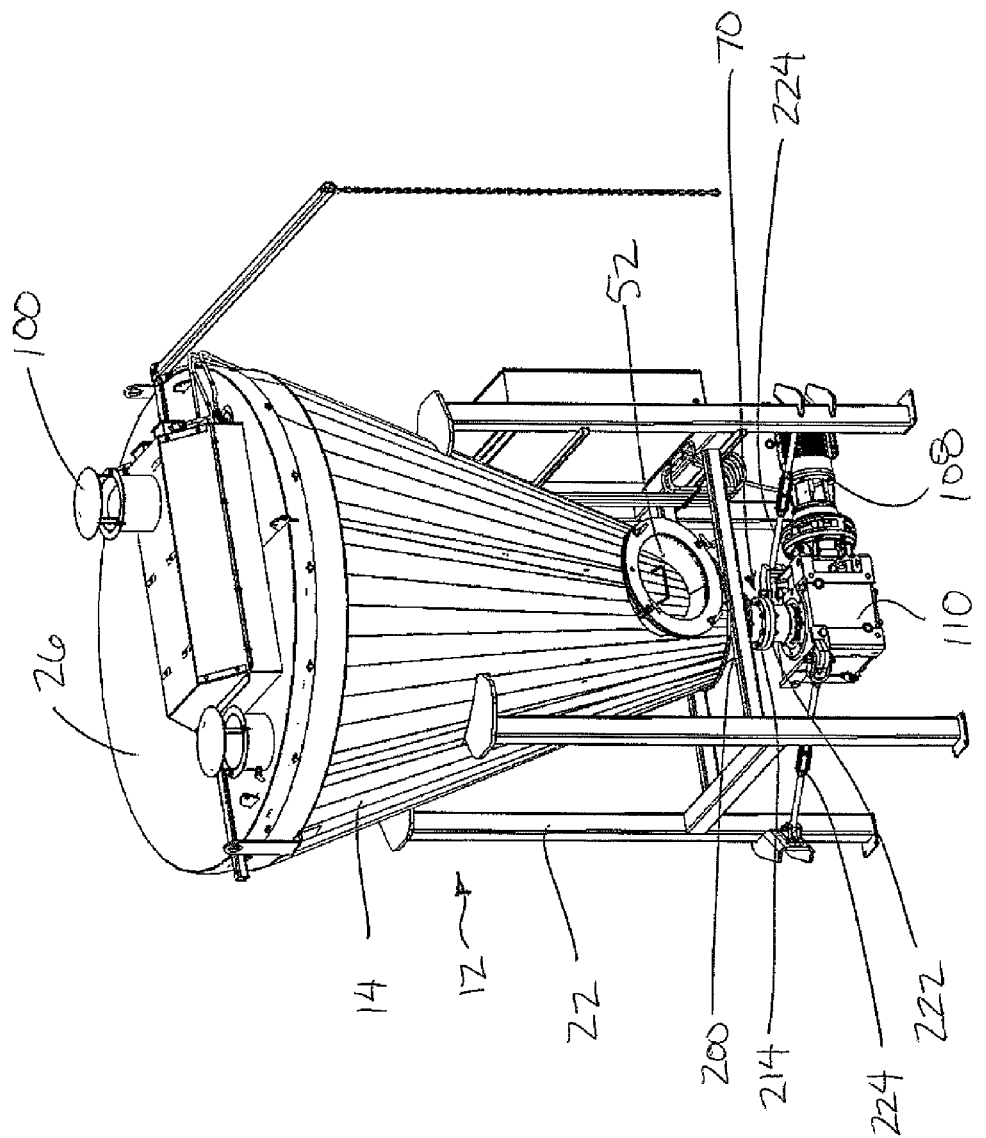
FIG. 18 is a perspective view of a further embodiment of the composter device.
Figure 19:
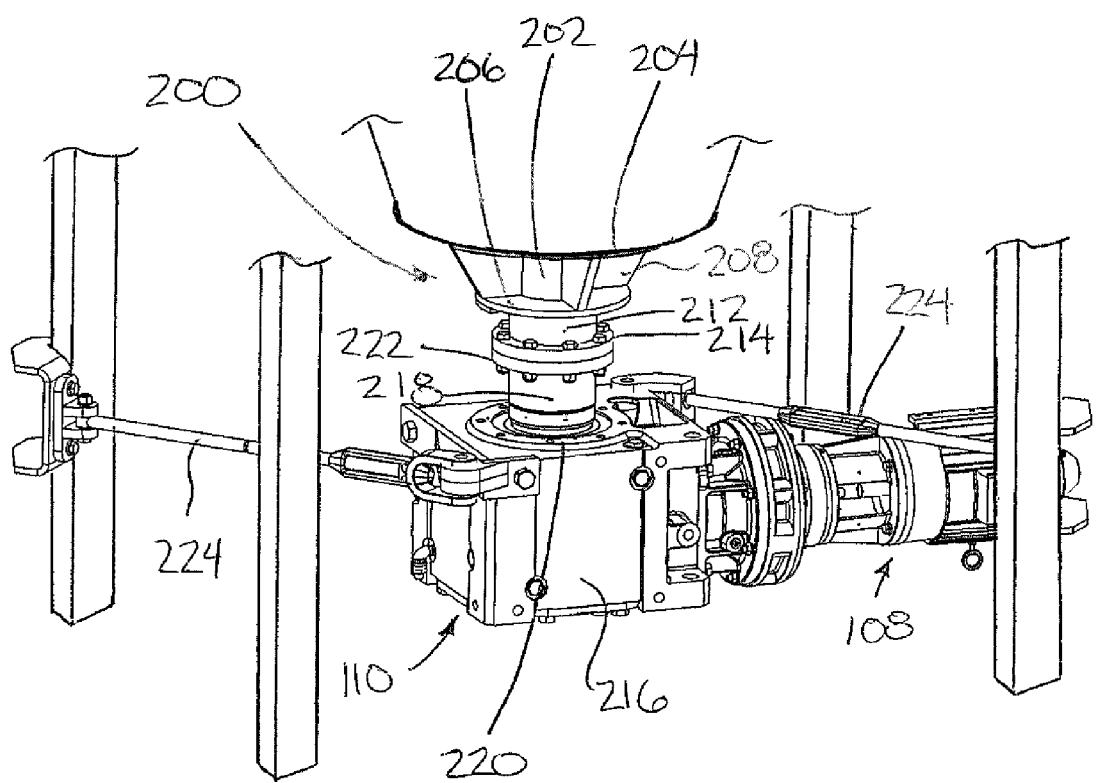
FIG. 19 is an enlarged perspective view of gearbox supported below the composting chamber in the composter device according to the embodiment of FIG. 18.
Figure 20:
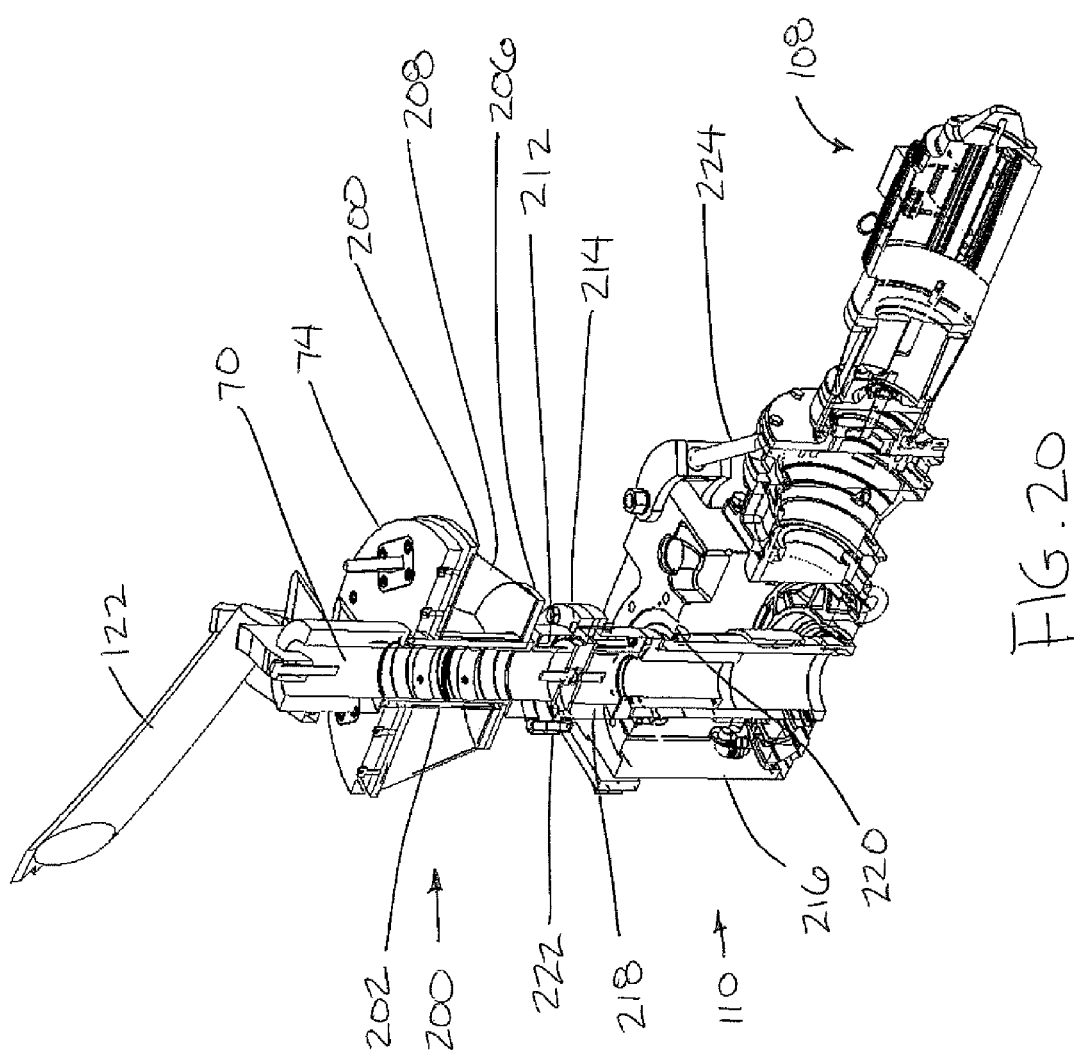
FIG. 20 is a vertical cross section of the gearbox according to FIG. 19 taken along an axis of rotation of the mixer and the motor of the gearbox.

The embodiment of FIG. 18 differs from previous embodiments in that there is provided a support member below the base plate forming the bottom wall of the composting chamber for supporting the drive shaft 70 of the mixer at axially spaced positions below the bottom end of the composting chamber. More particularly, the support member 200 comprises a sleeve 202 which is concentric about the axis of rotation through which the drive shaft 70 is concentrically received. The sleeve is supported in fixed relation to the side walls of the composting chamber by an upper plate 204 spanning radially outward from the top end of the sleeve in fixed connection therewith. A lower plate 206 spans radially outward from the bottom end of the sleeve 202 in fixed connection therewith so as to be joined to the upper plate by the sleeve 202 and by a plurality of webs 208 functioning as gussets which span radially outward from the sleeve at circumferentially spaced positions and which are joined vertically between the upper and lower plates of the support member. A pair of annular bearings 210 are mounted at axially spaced positions within the sleeve 202 of the support member to provide support between the drive shaft 70 extending rotatably therethrough. The bearings 210 in the support member 200 serve to accommodate all of the off axis loading of the mixer and the grinder thereabove so that the gearbox 110 and motor 108 therebelow are isolated from any torque or moment applied to the sweep arm which urges the axis of rotation of the mixer to be offset from a vertical and concentric orientation with the composing chamber.

The drive shaft 70 includes an end portion 212 extending downwardly beyond the support member 200 and terminating at a bottom flange 214 such that the end portion 212 and bottom flange 214 of the drive shaft are rotatable with the drive shaft and mixer about the common vertical axis thereof. The end portion 212 supports the gearbox 110 and motor 108 suspended thereon below the composting chamber.

The gearbox 110 in this instance comprises a housing 216 rotatably supporting an output shaft 218 protruding therefrom by respective gearbox bearings 220. The bearings 220 are mounted in relation to a side wall of the gearbox housing through which the output shaft 218 rotatably projects. The motor 108 is coupled to an inlet side of the gearbox housing to drive the rotation of the output shaft of the gearbox relative to the gearbox housing. The output shaft is oriented for rotation about the common vertical axis of the drive shaft 70 of the mixer 66 and includes a top flange 222 at the top end thereof which is suitable for a mating and bolted connection to the bottom flange 214 of the end portion of the drive shaft 70 using threaded fasteners. Once the top flange 222 of the output shaft of the gearbox is connected to the bottom flange 214 on the end portion of the drive shaft 70 the gearbox housing remains suspended spaced below the composting chamber. Substantially all of the support of the gearbox and motor coupled thereto in the vertical or axial direction is provided by the rotatable support of the gearbox housing on the output shaft 218 by the gearbox bearings 220.

To resist rotation of the gearbox housing relative to the base frame 22 and composting chamber 12, a pair of torque arms 224 are provided. The torque arms 224 are coupled to the gearbox housing at diametrically opposed locations and each spans tangentially in relation to the common vertical axis from an inner end connected to the gearbox housing to an outer end fixed on the base frame 22. The torque arms comprise rigid members arranged to have a fixed length in operation. A suitable threaded connection at an intermediate location on each torque arm permits the torque arms to be adjusted in length for balancing the tension between the two torque arms so that the two torque arms provide a substantially equal countering force to prevent rotation of the gearbox housing with the output shaft of the gearbox relative to the composting chamber.

The primary support provided by the torque arms is only to resist the relative rotation as the torque arms provide substantially no support in the vertical or axial direction of the common vertical axis between the gearbox housing and the base frame. No other connection is provided between the gearbox housing and the base frame such that the gearbox housing and motor are suspended below the composting chamber solely by rotatable support on the end portion of the drive shaft below the composting chamber.

Figure 21:
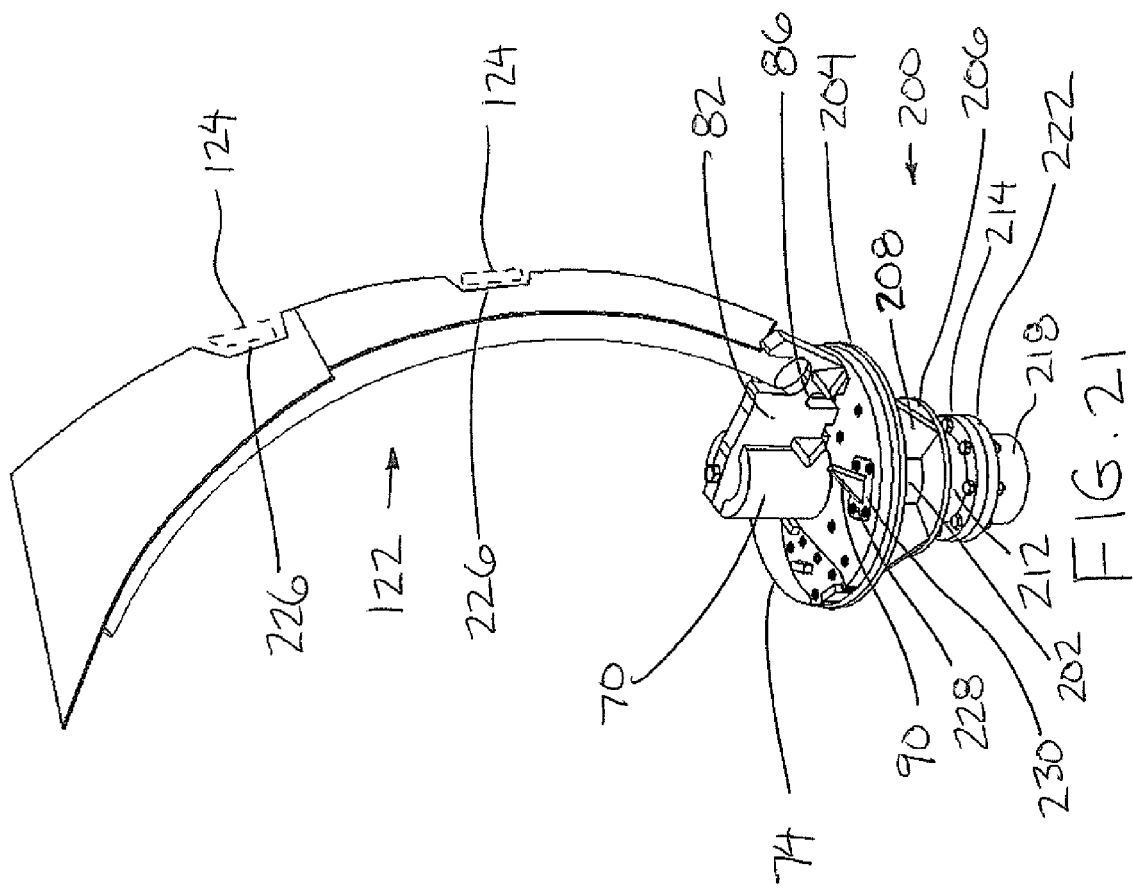
FIGS. 21 and 22 are perspective views of the mixer in the composter device according to the embodiment FIG. 18.
Figure 22:
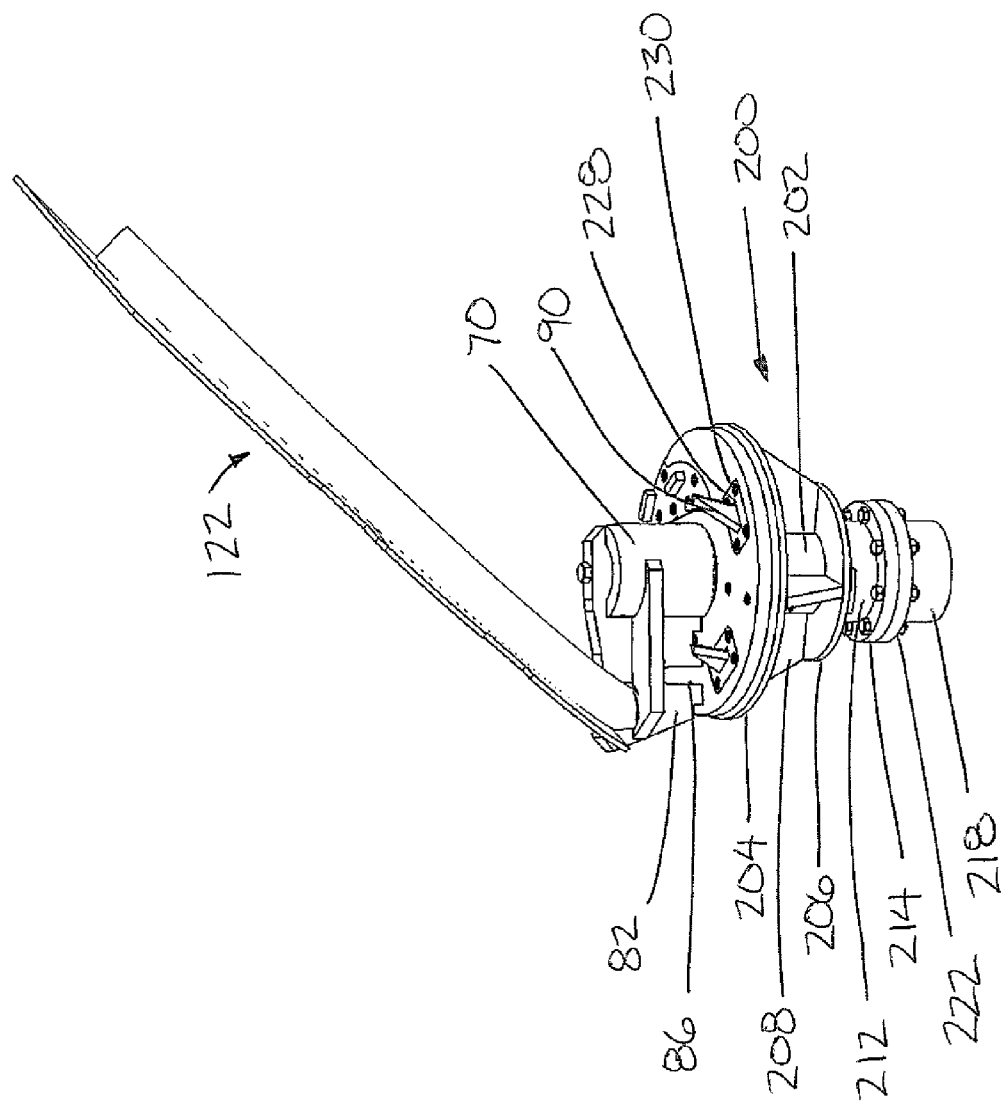

The sweep arm 122 of the mixer shown in FIGS. 21 and 22 includes an upper ramped surface similar to the previous embodiments which extends along the length of the sweep arm so as to be arranged to urge material in the composting chamber upwardly at a periphery of the chamber along the ramped surface as the mixer is rotated. Similarly to the embodiment of FIG. 17, the upper ramped surface is formed by plate material spanning generally horizontally in the radial direction between inner and outer edges while being sloped in the circumferential direction upwardly and away from the direction of rotation. The upper ramped surface of the sweep arm according to FIGS. 21 and 22 remains flat in a single inclined plane in its mounted position with an outer edge of the plate being curved to follow the contour of the conical wall. The inner edge is concave also, however the overall horizontal width in the lateral direction increases with increasing distance from the bottom end of the chamber. The flat plate forming the upper ramped surface defines the full width of the sweep arm spanning horizontally between the inner and outer edges in the radial direction. As in previous embodiments, the outer edge of the sweep arm increases in radius from the axis of rotation with increasing distance from the bottom end of the chamber such that the effective diameter of the sweep arm increases towards the top end thereof. The sweep arm thus remains adjacent to the conical wall along the full length of the sweep arm between the top and bottom ends as in previous embodiments.

The mixer 66 according to FIGS. 21 and 22 also differs from previous embodiments in that the flat plate defining the upper ramped surface is provided with additional support by a rigid support member joined beneath the plate forming the upper ramped surface along the full length thereof. The support member comprises a curved rod or tube which stiffens the plate material forming the upper ramped surface.

The plate forming the upper ramped surface also includes a pair of notches 226 formed in the outer edge defining vertically spaced apart slots in alignment with respective fixed member 124 in the form of protrusions on the conical side wall of the chamber. The fixed members passed through the slots formed by the notches 226 as the sweep arm is rotated past the conical side wall of the composting chamber. By providing notches 226 in alignment with the fixed members 124 on the side wall, the outer edge can be located in closer proximity to the side wall of the housing while the fixed members 124 provide some additional mixing or grinding action.

Each of the lugs forming the second grinding elements in FIGS. 21 and 22 are fixed onto a respective base member 228 arranged to be mounted within a respective recess 230 in the base plate 74 of the composting chamber. Each lug is fixed to its respective base member 228 by welding with the base member being fastened substantially flush at the top side thereof with the surrounding base plate 74 when the base member is mounted within its respective recess. The base members are secured by threaded fasteners such that the lugs can be readily removed and replaced as may be desired.

In further embodiments various control features may be provided for controlling the amount of air, water and heat provided to the material to be composted. The vent 100, for instance, may be provided with a closable lid which is selectively opened only when excess heat is to be removed at selected times during the composting process.

In use, the lid 26 of the composer device is first opened to permit loading of the composting chamber through the opening formed in the top end of the device. Material to be composted may include various types of organic matter. When composting an animal carcass, additional cellulose fibre or material in the form of straw or sawdust is added along with any moisture required so that the desired mixture has a moisture approximately in the range of 50%. Once loaded, the lid is closed and sealed shut and the grinding operation begins by steadily rotating the working shaft with the first grinding element supported thereon for a prescribed period of time until the matter to be composted is sufficiently ground into a ground material having a particle size which is sufficiently reduce to optimize the composting process.

Rotation of the working shaft can then be stopped to permit the material to be composted to remain in the composting chamber for decomposition. During the decomposition period moisture levels and temperature are periodically checked automatically by the controller. An ideal temperature range is maintained between 130 and 150 degrees Fahrenheit. The compositing period in which the matter remains in the composting chamber for decomposition is typically in the order of approximately 100 hours during which the motor is periodically activated to rotate the mixer 66 to stir the ground matter to be composted so that air is circulated through the mixture. The periodic intervals of stirring by the mixer are preset again for optimized decomposition.

During the mixing process rotation of the working shaft causes the mixer to rotate in a manner in which the ground matter to be decomposed rises up along the mixer, either at the center or at the periphery of the composting chamber depending upon the embodiment. The matter to be composted is subsequently permitted to fall down from the top of the mixer in a churning action until the matter is once again gathered by the mixer due to the downward and inwardly taper of the walls 14 which guide the decomposing matter to the bottom of the mixer. Further mixing is provided by the grinder 68 due to the guide teeth 94 which urges matter down into the slots for being subjected to the crushing and shearing action of the second grinding elements passing through the slots in the first grinding element rotated past it. Once the decomposition process has been sufficiently completed, the discharge chute is opened at the door 56 so that an auger placed near or in the discharge chute can unload the decomposed matter through the door opening.

While various embodiments of the present invention have been described in the foregoing, it is to be understood that other embodiments are possible within the scope of the invention. The invention is to be considered limited solely by the scope of the appended claims.

The invention claimed is:

1. A method for composting a whole object, the method comprising:
    providing a housing having a composting chamber arranged to receive the whole object therein;
    providing a grinder supported in the composting chamber at the bottom end of the composting chamber; and
    providing a mixing member supported in the composting chamber above the grinder for rotation about an upright axis relative to the housing in which the mixing member is open and unobstructed along the upright axis member in the form of a sweep arm which spirals upwardly in a direction sloping away from a direction of rotation of the sweep arm from a bottom end of the sweep arm adjacent the grinder at the bottom end of the chamber to a top end of the sweep arm spaced above the grinder at the bottom end of the chamber such that the sweep arm is in proximity to a wall of the composting chamber throughout a full length of the sweep arm between the bottom end and the top end of the sweep arm;
    providing the grinder with a first grinding element and a second grinding element rotatable relative to one another about the upright axis of the mixing member in which;
        the first grinding element comprises a rigid member including a slot formed therein which extends fully through the rigid member from a first side to a second side of the rigid member and defining first edges at a periphery of the slot; and
        the second grinding element comprises a lug defining second edges which closely fits within the slot and which is arranged to pass fully through the slot from the first side to the second side of the rigid member as the grinding elements are rotated relative to one another;
    inserting the whole object into the composting chamber along the unobstructed upright axis of the mixing member to the grinder at the bottom end of the composting chamber;
    grinding the whole object into a ground material at the bottom end of the composting chamber by fixing one of the grinding elements to be stationary relative to the housing and rotating the other grinding element relative to the housing such that the first edges of the first grinding element are rotated in close proximity past the second edges of the second grinding element so as to produce a shearing action between the first and second edges; and
    mixing the ground material in the composting chamber by rotating the mixing member such that the sweep arm moves about the composting chamber in a sweeping motion adjacent to the wall of the composting chamber to urge the ground material from the grinder at the bottom end of the composting chamber upwardly along the wall of the composting chamber.

2. The method according to claim 1 wherein the rigid member extends radially out from the upright axis of the mixing member and wherein the lug is arranged to pass through the slot in the rigid member in a circumferential direction from the first side to the second side of the rigid member in relation to the upright axis.

3. The method according to claim 1 wherein the slot in the rigid member is open to a bottom side of the rigid member and wherein the lug is supported on a bottom wall of the composting chamber.

4. The method according to claim 1 including providing a horizontal base plate at the bottom of the composting chamber which supports the lug thereon and locating the rigid member directly adjacent the base plate such that the rigid member and the base plate are rotatable relative to one another.

5. The method according to claim 4 including providing a plurality of lugs supported on the base plate so as to be arranged to be received in the slot as the first and second grinding elements are rotated relative to one another.

6. The method according to claim 1 including rotating the first grinding element relative to the housing and fixing the second grinding element such that the second grinding element is stationary relative to the housing.

7. The method according to claim 1 including providing the lug with a leading edge which extends upwardly at an inclination in a direction of rotation of the grinding element towards the slot of the other grinding element to confront the other grinding element as the grinding elements are rotated relative to one another.

8. A method for composting a whole object, the method comprising:
    providing a housing having a composting chamber arranged to receive the whole object therein;
    providing a grinder supported in the composting chamber at the bottom end of the composting chamber; and
    providing a mixing member supported in the composting chamber above the grinder for rotation about an upright axis relative to the housing in which the mixing member is open and unobstructed along the upright axis member in the form of a sweep arm which spirals upwardly in a direction sloping away from a direction of rotation of the sweep arm from a bottom end of the sweep arm adjacent the grinder at the bottom end of the chamber to a top end of the sweep arm spaced above the grinder at the bottom end of the chamber such that the sweep arm is in proximity to a wall of the composting chamber throughout a full length of the sweep arm between the bottom end and the top end of the sweep arm;
    providing the grinder with a first grinding element and a second grinding element rotatable relative to one another about the upright axis of the mixing member in which;
        the first grinding element comprises a rigid member including a slot formed therein which extends fully through the rigid member from a first side to a second side of the rigid member and defining first edges at a periphery of the slot; and
        the second grinding element comprises a lug defining second edges which closely fits within the slot and which is arranged to pass fully through the slot from the first side to the second side of the rigid member as the grinding elements are rotated relative to one another;
    providing the rigid member with at least one guide tooth above the slot which projects into a direction of relative rotation of the rigid member in which said at least one guide tooth comprises a leading edge extending downwardly and inwardly towards the slot;
    inserting the whole object into the composting chamber along the unobstructed upright axis of the mixing member to the grinder at the bottom end of the composting chamber;
    grinding the whole object into a ground material at the bottom end of the composting chamber by rotating the first edges of the first grinding element in close proximity past the second edges of the second grinding element so as to produce a shearing action between the first and second edges; and
    mixing the ground material in the composting chamber by rotating the mixing member such that the sweep arm moves about the composting chamber in a sweeping motion adjacent to the wall of the composting chamber to urge the ground material from the grinder at the bottom end of the composting chamber upwardly along the wall of the composting chamber.

9. The method according to claim 1 including fully supporting the sweep arm relative to the housing at the bottom end by axially spaced apart bearings such that the top end of the sweep arm comprises a free unsupported end.

10. The method according to claim 1 including providing the composting chamber with a conical wall tapering downwardly and inwardly towards the grinder at the bottom end of the chamber and providing the sweep arm with an increasing diameter with increasing distance from the bottom end to the top end such that the sweep arm is in proximity to the conical wall throughout the full length of the sweep arm.

11. The method according to claim 1 including providing a fixed member supported on a wall of the composting chamber at an intermediate location along the length of the sweep arm in alignment with a slot on the sweep arm such that the fixed member passes through the slot as the mixing member is rotated.

12. The method according to claim 11 including providing a plurality of fixed members supported on the wall of the composting chamber in alignment with said slot on the sweep arm.

13. The method according to claim 1 including providing the sweep arm of the mixing member with an upper ramped surface extending along a length of the sweep arm and spanning horizontally in a radial direction across a width of the sweep arm and urging the ground material in the composting chamber upwardly at a periphery of the chamber along the ramp surface of the mixing member as the mixing member is rotated.

14. The method according to claim 1 including providing a gearbox having a gearbox housing and a gearbox output shaft supported for rotation relative to the gearbox housing by respective gearbox bearings, providing the mixing member with a drive shaft extending through the bottom end of the composting chamber for rotation relative to the housing of the composting chamber with the mixing member about the upright axis, and supporting the drive shaft of the mixing member for rotation relative to the housing of the composting chamber by a pair of bearings spaced apart from one another in an axial direction at a location below the bottom end of the composting chamber and spaced above the gearbox bearings in the gearbox housing.

15. The method according to claim 1 including providing a fixed member supported on a wall of the composting chamber at an intermediate location along the length of the sweep arm, the fixed member having a thickness which is arranged to substantially fully span a gap between the sweep arm and the peripheral wall as the sweep arm is rotated past the fixed member.

16. A method for composting a whole object, the method comprising:
    providing a housing having a composting chamber arranged to receive the whole object therein;
    providing a grinder supported in the composting chamber at the bottom end of the composting chamber; and
    providing a mixing member supported in the composting chamber above the grinder for rotation about an upright axis relative to the housing in which the mixing member is open and unobstructed along the upright axis member in the form of a sweep arm which spirals upwardly in a direction sloping away from a direction of rotation of the sweep arm from a bottom end of the sweep arm adjacent the grinder at the bottom end of the chamber to a top end of the sweep arm spaced above the grinder at the bottom end of the chamber such that the sweep arm is in proximity to a wall of the composting chamber throughout a full length of the sweep arm between the bottom end and the top end of the sweep arm;

providing the grinder with a first grinding element and a second grinding element rotatable relative to one another about the upright axis of the mixing member in which;

the first grinding element comprises a rigid member including a slot formed therein which extends fully through the rigid member from a first side to a second side of the rigid member and defining first edges at a periphery of the slot; and the second grinding element comprises a lug defining second edges which closely fits within the slot and which is arranged to pass fully through the slot from the first side to the second side of the rigid member as the grinding elements are rotated relative to one another;

inserting a whole livestock carcass into the composting chamber along the unobstructed upright axis of the mixing member to the grinder at the bottom end of the composting chamber;

grinding the whole livestock carcass into ground material at the bottom end of the composting chamber by rotating the first edges of the first grinding element in close proximity past the second edges of the second grinding element so as to produce a shearing action between the first and second edges;

mixing the ground material in the composting chamber by rotating the mixing member such that the sweep arm moves about the composting chamber in a sweeping motion adjacent to the wall of the composting chamber to urge the ground material from the grinder at the bottom end of the composting chamber upwardly along the wall of the composting chamber; and composting the ground material in the composting chamber.

17. The method according to claim 1 including rotating the first grinding element past the second grinding element so as to produce a scissor-like cutting action which grinds the whole object into the ground material.

* * * * *